(12) United States Patent
Wang et al.

(10) Patent No.: US 12,244,970 B2
(45) Date of Patent: *Mar. 4, 2025

(54) METHOD AND SYSTEM FOR PROVIDING AT LEAST ONE IMAGE CAPTURED BY A SCENE CAMERA OF A VEHICLE

(71) Applicant: Apple Inc., Cupertino, CA (US)

(72) Inventors: Lejing Wang, Sunnyvale, CA (US); Thomas Alt, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,943

(22) Filed: Jun. 13, 2023

(65) Prior Publication Data

US 2023/0328207 A1    Oct. 12, 2023

Related U.S. Application Data

(63) Continuation of application No. 16/938,660, filed on Jul. 24, 2020, now abandoned, which is a
(Continued)

(51) Int. Cl.
*B60R 11/04* (2006.01)
*G06F 3/01* (2006.01)
(Continued)

(52) U.S. Cl.
CPC ............ *H04N 7/181* (2013.01); *B60R 11/04* (2013.01); *G06F 3/013* (2013.01); *G06V 40/19* (2022.01);
(Continued)

(58) Field of Classification Search
CPC ........ H04N 7/181; G06V 40/19; G06V 20/56; B60R 11/04; B60R 2300/105; G06F 3/013
(Continued)

(56) References Cited

U.S. PATENT DOCUMENTS

| 9,547,917 B2 | 1/2017 | Zamer |
| 10,375,357 B2 | 8/2019 | Wang |

(Continued)

FOREIGN PATENT DOCUMENTS

| CN | 103718134 A | 4/2014 |
| CN | 103987578 A | 8/2014 |

(Continued)

*Primary Examiner* — Jayanti K Patel
*Assistant Examiner* — Richard B Carter
(74) *Attorney, Agent, or Firm* — Blank Rome LLP

(57) ABSTRACT

The present disclosure relates to a method of providing at least one image of at least one real object captured by at least one scene camera of a plurality of scene cameras mounted on a vehicle. The method includes: providing camera poses of respective scene cameras of the plurality of scene cameras relative to a reference coordinate system associated with the vehicle, providing user attention data related to a user captured by an information capturing device, providing at least one attention direction relative to the reference coordinate system from the user attention data, determining at least one of the scene cameras among the plurality of scene cameras according to the at least one attention direction and the respective camera pose of the at least one of the scene cameras, and providing at least one image of at least one real object captured by the at least one of the scene cameras.

20 Claims, 12 Drawing Sheets

Related U.S. Application Data continuation of application No. 16/448,693, filed on Jun. 21, 2019, now Pat. No. 10,757,373, which is a continuation of application No. 14/581,609, filed on Dec. 23, 2014, now Pat. No. 10,375,357, which is a continuation-in-part of application No. PCT/EP2014/068165, filed on Aug. 27, 2014.

(51) Int. Cl.
*G06V 40/19* (2022.01)
*H04N 7/18* (2006.01)
*G06V 20/56* (2022.01)

(52) U.S. Cl.
CPC ........ *B60R 2300/105* (2013.01); *G06V 20/56* (2022.01)

(58) Field of Classification Search
USPC .......................... 348/148, 78; 340/435, 575
See application file for complete search history.

(56) References Cited

U.S. PATENT DOCUMENTS

| | | | |
|---|---|---|---|
| 10,757,373 B2 * | 8/2020 | Wang | ...................... G06F 3/013 |
| 2005/0202844 A1 | 9/2005 | Jabri | |
| 2007/0008091 A1 * | 1/2007 | Takenaga | ........... B62D 15/0295 |
| | | | 340/435 |
| 2008/0181591 A1 | 7/2008 | Hongo | |
| 2009/0128618 A1 | 5/2009 | Fahn | |
| 2009/0299684 A1 | 12/2009 | Imanishi | |
| 2009/0304232 A1 | 12/2009 | Tsukizawa | |
| 2010/0049393 A1 | 2/2010 | Emam | |
| 2010/0201816 A1 | 8/2010 | Lee | |
| 2011/0243532 A1 | 10/2011 | Bostaph | |
| 2013/0100289 A1 | 4/2013 | Arant | |
| 2014/0093187 A1 | 4/2014 | Yehezkel | |
| 2014/0139655 A1 * | 5/2014 | Mimar | ............... G08B 21/0476 |
| | | | 340/575 |
| 2014/0204193 A1 * | 7/2014 | Zhang | ................... G06V 40/18 |
| | | | 348/78 |
| 2014/0354798 A1 | 12/2014 | Galarraga | |
| 2015/0006278 A1 | 1/2015 | Di Censo | |
| 2015/0036931 A1 | 2/2015 | Loui | |
| 2015/0221341 A1 | 8/2015 | Akay | |

FOREIGN PATENT DOCUMENTS

| | | |
|---|---|---|
| EP | 1301021 A2 | 4/2003 |
| EP | 2562684 A2 | 2/2013 |
| JP | 2007133639 A | 5/2007 |

\* cited by examiner

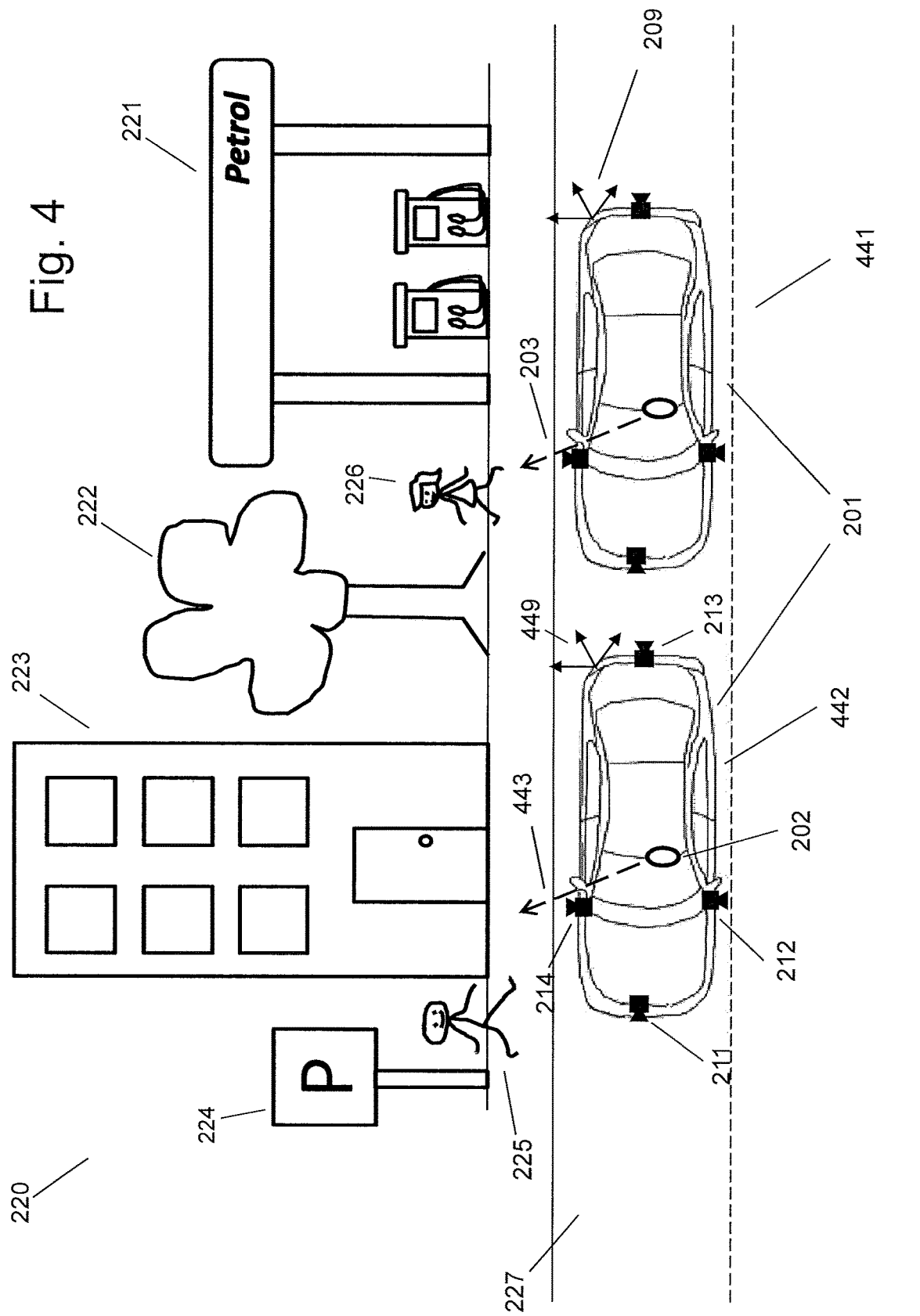

METHOD AND SYSTEM FOR PROVIDING AT LEAST ONE IMAGE CAPTURED BY A SCENE CAMERA OF A VEHICLE

BACKGROUND

1. Technical Field

The present disclosure is related to a method and system for providing at least one image of at least one real object captured by at least one scene camera of a plurality of scene cameras mounted on a vehicle.

2. Background Information

In a potential situation, a person may be interested in an object of a real environment (often called "object of interest"), e.g. in a surrounding environment. The person (herein also referred to as user) may be interested in further identifying the object of interest and/or in determining similar objects. In a particular example, the user may want to find out if the same object (also called item) and/or similar objects are available for purchasing. The user may then wish to make an order for purchasing one or more objects (e.g. the same or a similar object) or may then wish to find a store for hands-on checking and purchasing the one or more objects.

For this purpose, for example, the user may use a camera to capture an image of the object of interest and identify the same or similar items based on image analysis.

U.S. Pat. No. 8,228,364 B2 discloses a method and system for an omnidirectional camera which can be used to record an event happening around a police vehicle. The system and method include an omnidirectional camera and a digital processor that processes the images taken by the camera. The direction of the signal generated by the microphone determines the region of interest.

U.S. Pat. No. 6,580,373 B1 discloses a vehicle-mounted image record system for encouraging safe driving of a vehicle by recording images of the surface of the road and part of the vehicle. The system includes one or more cameras mounted on the vehicle and a recording device that records the images captured by the cameras. In the event of an accident the recorded images can be used as proof of safe driving.

U.S. Pat. No. 7,119,832 B1 discloses an in-car video system where a wireless microphone is configured with bi-directional communications capability. When an RF activation signal is received, the wireless microphone is automatically switched on to capture an audio soundtrack that accompanies the images captured by the car-mounted video camera. A wireless microphone controller mounted in the car transmits the RF activation signal to the wireless microphone. When the video recording device starts recording, the wireless microphone controller transmits the RF activation signal.

Further, there is known a mobile phone application (so-called "App") called "ASAP54" that allows the user, upon seeing a particular outfit or style the user is interested in on a real person or magazine, to take a photograph of the outfit. By using image recognition the application can find that piece of clothing the user is looking at and a number of similar fashions. For employing this, the user is required to focus the camera of his/her mobile phone on the object of interest.

SUMMARY

It would be desirable to provide a method and system which facilitate for a user to retrieve information on a region of interest in the surrounding real environment of the user which can be electronically stored and processed for later use.

According to a first aspect, there is disclosed a method of providing at least one image of at least one real object captured by at least one scene camera of a plurality of scene cameras mounted to a vehicle, the method comprising providing camera poses of respective scene cameras of the plurality of scene cameras relative to a reference coordinate system associated with the vehicle, providing user attention data related to at least one user captured by an information capturing device, providing at least one attention direction relative to the reference coordinate system from the user attention data, determining at least one of the scene cameras among the plurality of scene cameras according to the at least one attention direction and the respective camera pose of the at least one of the scene cameras, and providing at least one image of at least one real object captured by the at least one of the scene cameras.

According to another aspect, there is disclosed a system for providing at least one image of at least one real object, comprising at least one processing device coupled to a plurality of scene cameras mounted to a vehicle, and to an information capturing device configured to capture user attention data related to at least one user. The at least one processing device is configured to provide camera poses of respective scene cameras of the plurality of scene cameras relative to a reference coordinate system associated with the vehicle, to provide at least one attention direction relative to the reference coordinate system from the user attention data, to determine at least one of the scene cameras among the plurality of scene cameras according to the at least one attention direction and the respective camera pose of the at least one of the scene cameras, and to provide at least one image of at least one real object captured by the at least one of the scene cameras.

For example, the at least one processing device according to the present disclosure, which may comprise one or more processing devices such as one or more microprocessors, is comprised, at least in part, in a mobile device (such as a mobile phone, wearable computer, tablet computer, mobile computer, often called laptop, or a head mounted display, such as used for optical see-through augmented reality applications), in the vehicle, and/or in a server computer adapted to communicate with the mobile device and/or the vehicle. The at least one processing device may be comprised in only one of these devices, e.g. in the mobile device or in the server computer, or may be a distributed system in which one or more processing tasks are distributed and processed by one or more processing devices of a processing system which are distributed and are communicating with each other, e.g. by point to point communication or via a network.

Any steps, embodiments, aspects and examples described herein with respect to the method can equally or analogously be implemented by the at least one processing device being configured (by software and/or hardware) to perform the respective steps, embodiments, aspects or examples. Any used processing device, such as one or more microprocessors, may be configured as such by software and/or hardware and communicate via a communication network, e.g. via a server computer or a point to point communication, with one or more cameras, displays, sensors and/or any other components disclosed herein.

According to another aspect, the disclosure is also related to a computer program product comprising software code sections which are adapted to perform a method according to the invention, particularly as set out in any one of the claims. Particularly, the software code sections are contained on a computer readable medium which is non-transitory. The software code sections may be loaded into the memory of one or more processing devices (such as microprocessors) as described herein. Any used processing devices, such as one or more microprocessors, may communicate via a communication network, e.g. via a server computer or a point to point communication, with other devices as described herein.

BRIEF DESCRIPTION OF THE DRAWINGS

Aspects and embodiments of the invention will now be described with respect to the drawings, in which:

FIG. 4 shows another exemplary scenario according to an embodiment of the invention.

DESCRIPTION

Nowadays, people often spend a lot of time in a vehicle, for example when they are on the way to shopping, commuting or sightseeing. Potentially, there may be many different objects (e.g. pedestrians, clothes worn by pedestrians, advertisement posters, real stores, etc.) in the surroundings of the vehicle when it travels along its way. It would be difficult and impractical for people sifting in a vehicle to use, e.g., a mobile device equipped with a camera (e.g. a standard camera or a mobile phone with a camera) for capturing an image of an object of interest of an environment surrounding the vehicle. This is particularly the case for a driver who is driving the vehicle. The driver would not be able and allowed to hold the mobile device to capture an image during driving.

In a potential exemplary scenario, in which a person is driving a car from one location to another, he or she may find an object of interest, for instance a skirt worn by a pedestrian walking on a sidewalk next to the vehicle. The inventors have found that it is beneficial to employ cameras mounted on the vehicle to capture an image containing the object of interest, instead of the driver holding a camera for capturing an image.

Increasingly, multiple cameras are mounted on vehicles, such as cars. The inventors further considered that images captured by each of the car mounted cameras and the processing thereof would increase complexity of object detection and/or recognition. Thus, the inventors found that it would be beneficial to determine a subset (i.e. one or more) of the vehicle mounted cameras and further process or analyze only images captured by the determined subset of the vehicle mounted cameras.

Aspects of the present disclosure are related to a method and system for determining at least one of a plurality of vehicle mounted cameras for capturing at least one image of a part of a real environment based on the direction and/or position of the user's attention while being in the vehicle. At least one image of an environment captured by the determined at least one camera can be used to determine one or more items (i.e. objects of interest) of the real environment.

The provided user attention data, e.g. captured by an information capturing device, according to the present invention are related to the user. Particularly, the user attention data are indicative of a user's attention towards a real object (particularly the object of interest) or a part of the real environment containing the real object.

According to an embodiment of the invention, as set out in more detail below, it is possible to look at an object of interest in the surroundings of the vehicle and to activate one or more vehicle cameras, e.g. by using voice, or gesture, or gaze direction, to capture an image of the object of interest (e.g., a piece of clothing), and then to determine whether the object of interest or similar items are available for purchasing.

Figure 1:
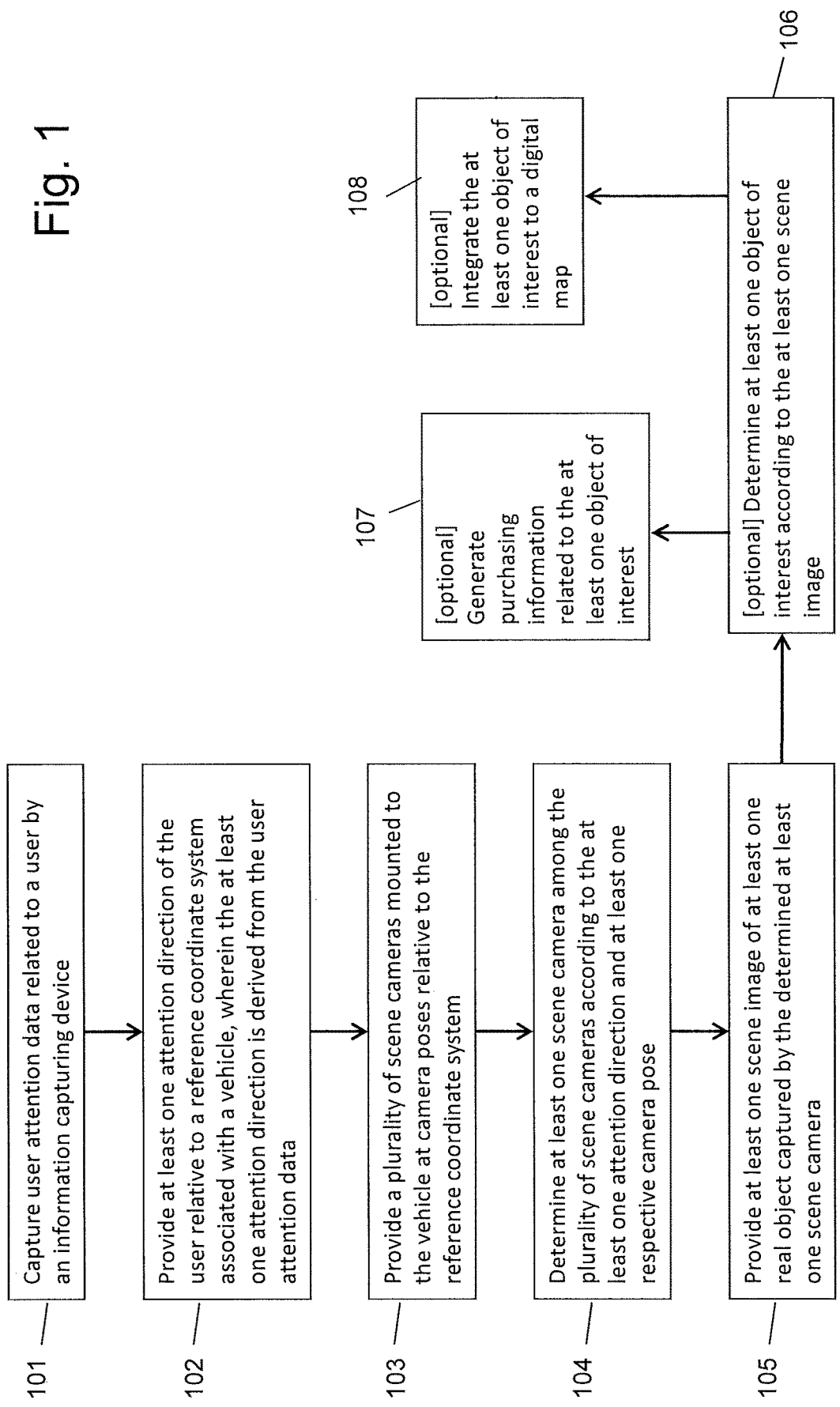
FIG. 1 shows a flow diagram of a method according to an embodiment of the invention.
Figure 2:
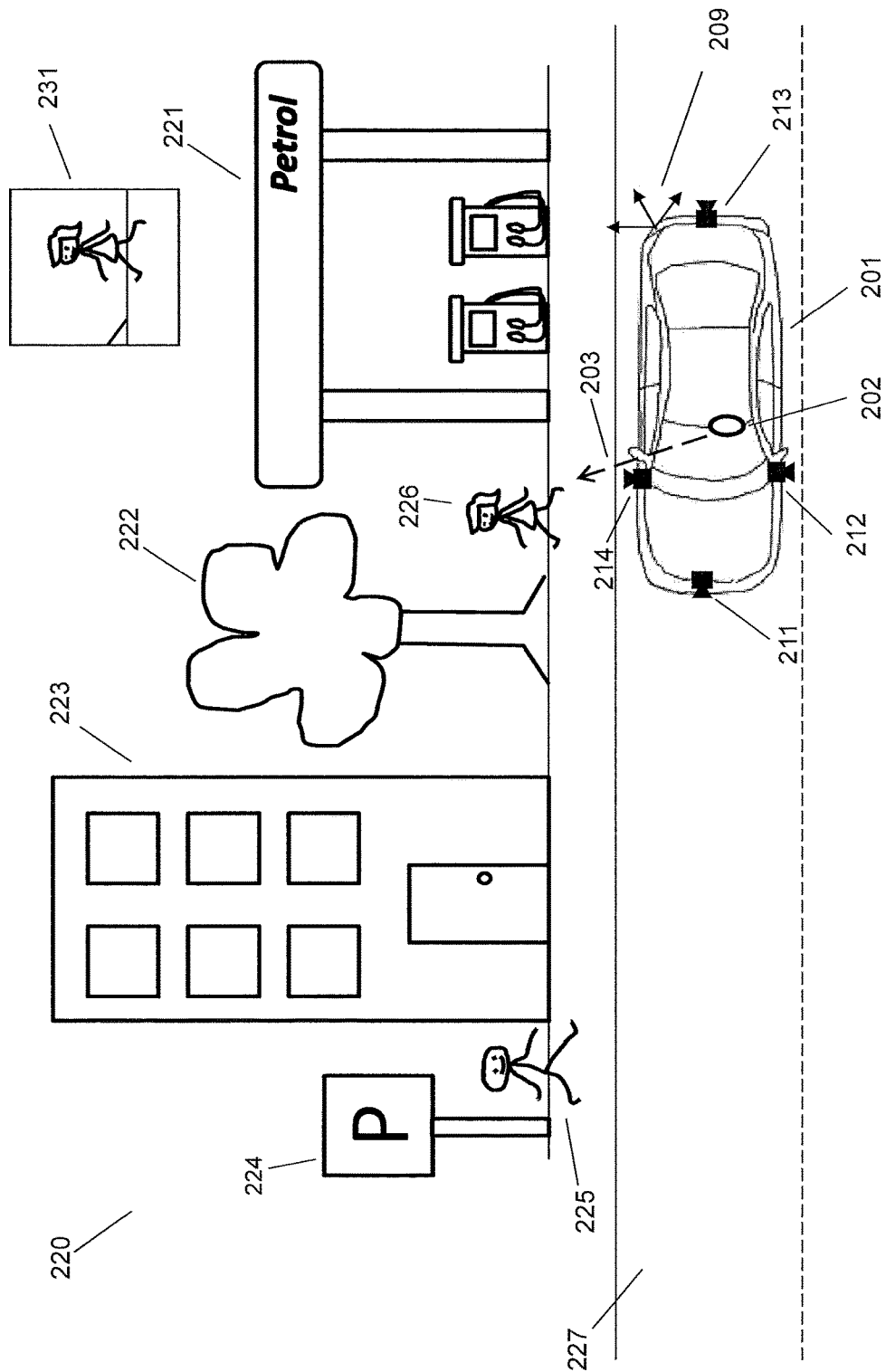
FIG. 2 shows an exemplary scenario according to an embodiment of the invention for providing at least one image of at least one real object captured by at least one camera mounted on a vehicle.
Figure 3:
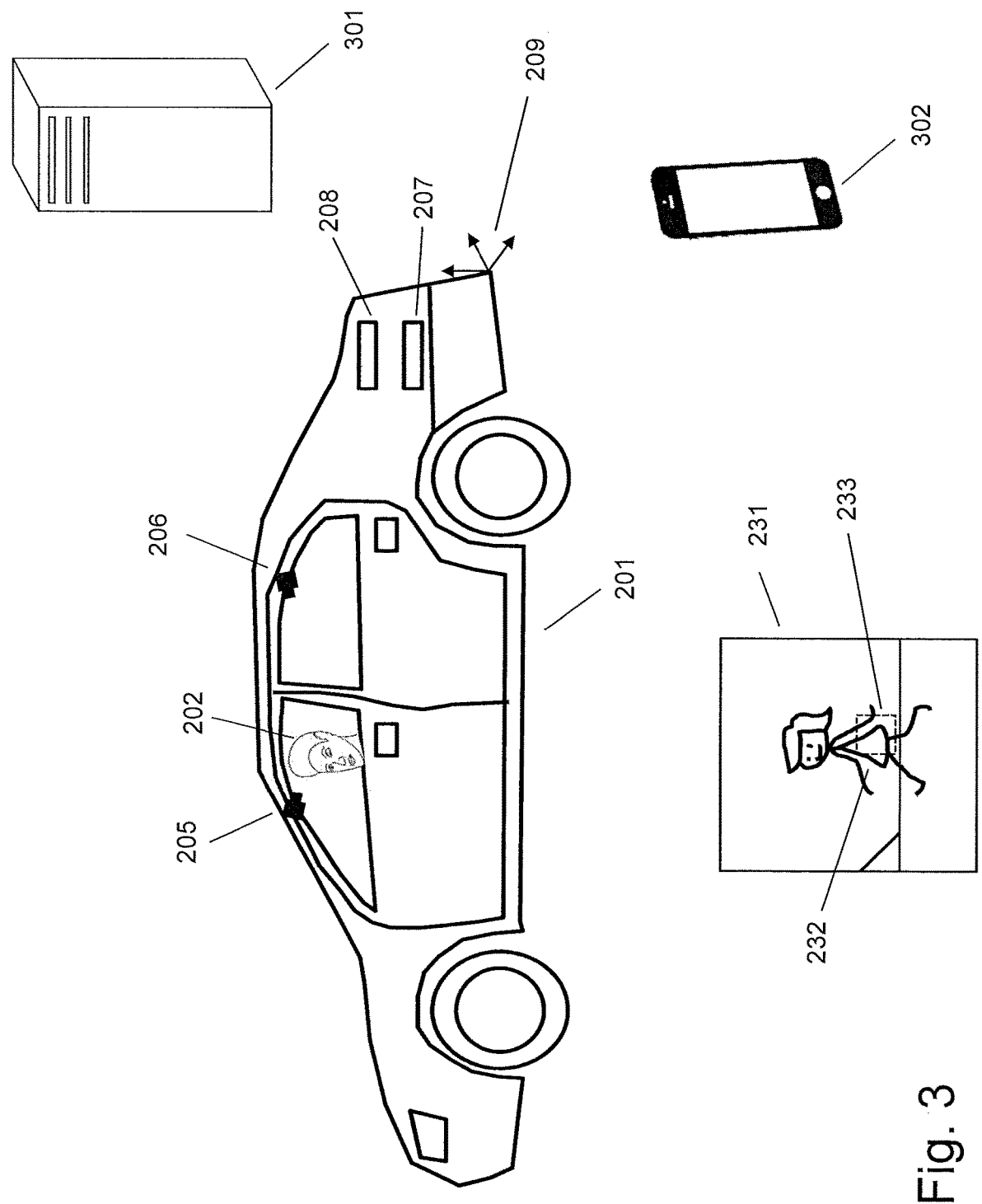
FIG. 3 shows an embodiment of a system setup which may be used in connection with aspects of the invention.

FIG. 1 shows a flow diagram of a method according to an embodiment of the invention providing at least one image of at least one real object captured by at least one camera mounted on a vehicle and further shows optional steps related to exemplary applications based on objects of interest determined according to the at least one image. FIG. 2 shows an exemplary scenario according to an embodiment of the invention for providing at least one image of at least one real object captured by at least one camera mounted on a vehicle. FIG. 3 shows an embodiment of a system setup which may be used in connection with aspects of the invention.

In the scenario of FIG. 2, a vehicle, in this example a car 201, is driving through a real environment 220. The real environment 220 includes real objects fixed in the environment, e.g. a gas station 221, a tree 222, a building 223, a park sign 224, and a road 227. The real environment 220 may also include movable real objects, like a person 226 and a person 225. The car 201 may also be considered as a part of the real environment 220. The car 201 is equipped with multiple scene cameras 211-214 mounted on the car. The driver 202 is looking or facing or pointing toward the direction 203.

FIG. 3 shows an embodiment of an interior setup for the car 201. There are provided two information capturing devices mounted in the car 201. In principle, one may suffice. In this example, the information capturing devices are comprising cameras, herein called user cameras 205 and 206. The car 201 may further be equipped with a communicating device 207, such as a wireless communication device (e.g. WLAN device or SIM card device), and a processing device 208, such as a microprocessor. All the steps or a part of the steps disclosed in this disclosure may be performed by the processing device 208 alone or in combination with any other processing device. All the steps or a part of the steps may also be performed by a remote processing device that is separate to the car 201, such as a server computer or a mobile device. In the present case, the car 201 may communicate with the remote processing device through the communicating device 207 via cable or wirelessly. The remote processing device may be a server computer 301 (e.g. a workstation) or a mobile device, e.g. a mobile phone 302.

According to the flow diagram of FIG. 1, step 101 captures user attention data related to a user (in FIG. 2, the driver 202) by an information capturing device (such as one of the cameras 205, 206 according to FIG. 3). The user attention data may be any data that represents at least one aspect of a user attention. Particularly, the user attention data represents or encodes information related to at least one direction, at least one position, and/or at least one indicated space or area of the user attention.

The user attention may be indicated by a gaze (or a stare). A direction from the user's eyes to where the eyes are looking may represent the gaze direction, which may be considered as an attention direction. Further, a field of view of one eye or two eyes of the user represents a space of the user attention of the gaze. A position where the user is looking at represents a position of the user attention.

In another example, the user attention may also be indicated by the user's face (e.g. a pose of the face or head). The pose of the user's face may represent where the user is focusing. At least one attention direction may be derived from the pose of the face. In one implementation, the at least one attention direction may be the same as the normal direction of the frontal face.

In a further example, the user attention may be indicated by finger pointing or any gesture indicative of directions, positions, and/or areas. An attention direction may be modeled by a direction axis. For example, the direction axis may be represented by a 2-vector. Further, the attention direction may be modeled by a field of view. For example, the user's position may determine the view point, and the field of view of the user's eye may define an attention direction. In another example, standard deviations of the direction axis (e.g. estimated errors of the frontal face direction from the face pose estimation) may determine an angle (e.g. vertical or horizontal range) for the field of view, which may be considered as an attention direction.

For example, the user attention data comprises at least one of, but is not limited to, one or more images captured by one or more cameras, a bioelectric signal (e.g. electrooculogram), and a mechanical signal (e.g. hand pressure).

In one embodiment, the information capturing device may comprise a camera device called user camera. The user camera may capture at least one user image of at least part of the user. For example, the camera 205 (i.e. a user camera) mounted on the car 201 may capture an image (i.e. a user image) of the front face of the user 202, as shown in FIG. 3.

In another embodiment, the information capturing device may be an eye tracking device. The eye tracking device (also called eye tracker) may measure the orientation of one or two eyes of the user and, thus, can provide gaze directions of the user. There are different types of eye tracking methods, like eye-attached tracking, optical tracking, and electric potential measurement. The eye-attached tracking may be implemented as special contact lens with an embedded sensor (like mirror or magnetic field sensors). The optical tracking can employ cameras to capture images of the eyes and determine the eye orientation from the images, for example as disclosed in Kaminski, Jeremy Yrmeyahu, DotanKnaan, and AdiShavit. "Single image face orientation and gaze detection." Machine Vision and Applications 21.1 (2009): 85-98 (hereinafter "Kaminski et al."). The electric potential measurement devices can measure electric potentials with electrodes placed around the eyes. One technique called electrooculography (EOG) system can measure electric potentials (the measured signal called electrooculogram). Bulling et al. present a wearable EOG goggle; e.g. see Bulling, Andreas, Daniel Roggen, and Gerhard Tröster. "Wearable EOG goggles; Seamless sensing and context-awareness in everyday environments." Journal of Ambient Intelligence and Smart Environments 1.2 (2009): 157-171.

In another embodiment, the information capturing device may be a mechanical sensor, like a pressure or force sensor. For example, it measures force or pressure applied by the user. The mechanical sensor may be a mechanical joystick.

Step 102 provides at least one attention direction of the user relative to a reference coordinate system associated with a vehicle, wherein the at least one attention direction is derived from the user attention data. For example, the attention direction 203 of the user 202 (i.e. driver) could be determined or defined in the reference coordinate system 209 associated with car 201. The attention direction 203 may indicate a gaze direction or face direction of the user 202, which may be estimated from an image (i.e. the user attention data) of the face of the user 202 captured by the camera 205 (i.e. the information capturing device) mounted in the car 201.

In some implementations, attention direction information may be contained in the captured user attention data. For example, an eye tracker may provide a gaze direction in the output signals. In other implementations, attention direction information may be derived (e.g. estimated) from the captured user attention data. For example, when a camera is used to capture one or more images of the user's face or eyes, the face pose or the gaze direction may have to be estimated from the camera images based on a computer vision method like that disclosed in Kaminski et al. or in Fanelli, Gabriele, Juergen Gall, and Luc Van Gool. "Real time head pose estimation with random regression forests." Computer Vision and Pattern Recognition (CVPR), 2011 IEEE Conference on. IEEE, 2011 (hereinafter "Fanelli et al.). According to the invention, the step of providing at least one attention direction relative to the reference coordinate system from the user attention data shall encompass all of these implementations and embodiments.

The attention direction may be determined relative to the information capturing device. In order to have the attention direction in a reference coordinate system associated with the vehicle, a device spatial relationship, e.g. 6 DOF (degrees of freedom) rigid transformation, between the vehicle and the information capturing device may be required. Then, the attention direction relative to the reference coordinate system may be determined from the attention direction relative to the information capturing device and the device spatial relationship.

The device spatial relationship may be determined from a calibration procedure. The calibration procedure is, for example, a mechanical calibration. For instance, the information capturing device (e.g. the camera 205) may be mounted at a known pose in the reference coordinate system of the vehicle (e.g. the car 201) using mechanical arms. The camera 205 may also be mounted at an arbitrary pose (i.e. unknown at the moment of the mounting). In this case, the camera 205 could capture an image of a part of the car 201. The image of the part of the car can be used to estimate the device spatial relationship based on a computer vision method (e.g. feature based pose estimation). It is also possible to use another tracking system to determine the device spatial relationship between the vehicle and the information capturing device. The tracking system may be a mechanical arm, an optical camera system, or a magnetic tracking system, or any motion or position sensor (e.g. gravity sensor, accelerometer, GPS).

In one embodiment, the information capturing device is or comprises one or more cameras. As shown in FIG. 3, the camera 205 (and 206) mounted inside the car 201 is part of the information capturing device. For example, the camera 205 has a known device spatial relationship with the reference coordinate system 209 associated with the car 201. It is possible to capture a user image of at least part of the face of the user 202.

The pose of the user's face can be estimated from the user image based on various computer vision methods (like proposed in Fanelli et al.). From the face pose, a direction of the frontal face can be determined as an attention direction. The attention direction 203 shown in FIG. 2 may represent the face direction.

According to an embodiment, multiple attention directions are determined. When the user image contains multiple faces (of multiple users sitting in the car), multiple face poses may be determined. In another example, the face of the user may move, and then multiple face directions may be determined for the same face. In this case, it is possible to estimate one main direction from the multiple attention directions. Different mathematical methods can be employed to determine a main direction from multiple directions. For example, each direction could have an angle relative to a common coordinate system. The main direction may be determined by an angle, which may be computed as an average, maximum, minimum, median or mean of the angles associated with the multiple directions. In FIG. 2, the attention direction 203 may be one direction estimated based on one user or a main direction based on multiple attention (e.g. face and/or gaze) directions estimated from one or more user images of one or more users.

It is also possible to estimate a gaze direction from the user image of least part of the face of the user 202 (e.g. as proposed in Kaminski et al.). The attention direction 203 shown in FIG. 2 can represent the gaze direction. The gaze direction of the user 202 may also be estimated from an eye tracker.

Further, when one or more user images capture at least part of a hand or an arm of the user, a hand pose can be estimated from the one or more user images according to any appropriate vision based method (e.g. like that proposed in de La Gorce, Martin, David J. Fleet, and Nikos Paragios. "Model-Based 3D Hand Pose Estimation from Monocular Video" or Erol, Ali, et al. "Vision-based hand pose estimation: A review." Computer Vision and Image Understanding 108.1 (2007): 52-73 (hereinafter "Erol et al.")). A hand gesture (or generally a gesture) may also be estimated, like according to a method as proposed in Erol et al. A direction (e.g. a pointing direction) as an attention direction may be derived from the hand pose. A hand pointing direction, or generally a gesture, may also be computed from the one or more user images. The attention direction 203 shown in FIG. 2 may represent such hand pointing direction.

According to an embodiment, face poses, gaze directions, and/or hand poses are estimated for one or more users from the same user attention data (e.g. from the same user image captured by a camera). Multiple directions (e.g. at least two of face directions, gaze directions, and hand directions) may be determined. The attention direction 203 may be determined as one of the multiple directions or as a main direction estimated based on the multiple directions.

In another embodiment, the camera 205 has unknown device spatial relationships with respect to the reference coordinate system 209 when a user image is captured by the camera 205. It is possible to determine the attention direction 203 relative to the reference coordinate system from the user image captured by the camera 205 without knowing the device spatial relationship. In an example, the user image captured by the camera 205 contains at least part of the car and at least part of the user. The at least part of the car has a known pose relative to the reference coordinate system of the car. The at least part of the user may contain the user face. In this case, the pose of the user's face or gaze direction can be determined in the reference coordinate system of the car based on a computer vision method using pixel information of the captured user image.

Step 103 provides a plurality of scene cameras mounted to the vehicle at respective camera poses relative to the reference coordinate system. In the embodiment shown in FIG. 2, four scene cameras 211-214 are mounted to the car 201, and the respective camera poses of the scene cameras 211-214 are known in the reference coordinate system 209.

Step 104 determines at least one of the scene cameras among the plurality of scene cameras according to the at least one attention direction and at least one respective camera pose. For example, it is possible to determine at least one of the scene cameras 211-214 as desired scene camera(s) according to the attention direction 203 and the respective camera poses of at least part of the scene cameras 211-214. One thought behind this is that attention directions of the user and/or positions of the user could indicate where or in which region or along which direction an object of interest locates in the real environment.

In an embodiment, multiple scene cameras mounted to the vehicle capture different regions of the real environment. For example, the scene cameras 211-214 capture different regions of the real environment 220 (e.g. four different sides) around the car 201. For example, they are arranged facing perpendicularly to one another, thus being directed towards four perpendicular sides. At least one attention direction of the user may be used to determine at least one scene camera among the scene cameras. The determined scene camera(s) could capture at least one scene image that may contain at least part of the object of interest indicated by the at least one attention direction.

The at least one scene image may be processed by various computer vision methods in order to recognize an object of interest, determine objects similar to the object of interest, reconstruct the 3D geometry of the object of interest, determine the position of the object of interest relative to the car or to the real environment, and/or determine the position of the vehicle in the real environment. Further, an attention direction relative to the car or relative to the scene camera may be considered in the computer vision methods. For example, the attention direction may be used to determine a region of interest in the at least one scene image. In another example, the attention direction may be used to determine image features based on distances between the corresponding features and the attention direction in 3D space or image distances between the image features and the image projection of the attention direction in the captured image.

A scene camera determined from attention directions:

It is possible to determine a scene camera (called desired scene camera) among the plurality of scene cameras according to an attention direction of the user. Further, multiple desired scene cameras among the plurality of scene cameras could also be determined similarly according to methods mentioned below. In one implementation, spatial relationships between the attention direction and each respective camera direction of at least part of the plurality of scene cameras is evaluated to determine a desired scene camera. The camera directions can be derived from related camera poses. A camera direction may indicate the direction of a respective camera optical axis.

In an example, a spatial relationship between the attention direction and a respective camera direction is an angle between the two direction axes. A threshold value may be given, and then a scene camera may be determined as a desired scene camera if the related angle is below the threshold. It is also possible to select a scene camera as a desired scene camera if the angle related to the selected scene camera is the smallest among angles related to the at least part of the scene cameras.

In another example, a spatial relationship between the attention direction and a respective camera direction is defined as an intersection. A camera direction may be defined as it originates from the position of the camera. It is also possible to select a scene camera as a desired scene camera if the direction axis of the selected scene camera intersects the attention direction. Further, when the attention direction intersects the direction axes of multiple scene cameras, the multiple scene cameras can be determined as desired scene cameras.

In a further embodiment, a desired scene camera is determined according to spatial relationships between the attention direction and each respective camera position of at least part of the plurality of scene cameras. A camera position may be derived from a camera pose of a related scene camera. A spatial relationship between the attention direction and a respective camera position may be defined as a distance from the camera position to the attention direction axis or a distance from the camera position to the user.

In a further embodiment, a desired scene camera is determined according to spatial relationships between the attention direction and each respective camera pose (including both direction and position) of at least part of the plurality of scene cameras.

In a further embodiment, a capturing coverage (e.g. field of view of a camera or manually defined) of a scene camera is provided. As shown in FIG. 2, the scene camera 211-214 cover front left, back and right of the car 201, respectively. When the attention direction is determined to point right of the car 201, then the scene camera 214 is determined as a desired camera.

In another embodiment, a desired scene camera is determined according to spatial relationships between the attention direction and each respective camera field of view of at least part of the plurality of scene cameras. For example, a spatial relationship between the attention direction and a respective camera field of view may be defined as intersects, (partially) covered by, or (partially) covers. A scene camera may be determined as a desired scene camera if the related camera field of view covers the attention direction or has the largest cover (i.e. an uncovered part of the attention direction is the smallest) or covers a certain part (e.g. a certain part beginning from the user position) of the attention direction among the at least part of the scene cameras. In another implementation, when the attention direction is covered by multiple scene cameras, the multiple scene cameras may be determined as desired scene cameras. When depth information is available for the scene cameras, the camera field of view may be limited to a certain depth based on the depth information, as objects behind the certain depth with respect to the camera would be occluded and not be captured in images.

One or more embodiments of determining at least one scene camera as at least one desired scene cameras disclosed herein could be combined for the determination.

In another embodiment, a scene camera may be an omni-camera (or a wide-angle camera) mounted to the car. The at least one attention direction may be used to determine a region of interest in at least one scene image captured by the omni-camera.

In a further embodiment, it is possible to determine a scene camera (called desired scene camera) according to multiple attention directions. The multiple attention directions may come from one user or different users. The multiple attention directions may be obtained from the same or several different user attention data.

In one implementation, a desired attention direction (may be or may be not one of the multiple attention directions) may be estimated from the multiple attention directions. Each respective attention direction of the multiple attention directions has an angle relative to a common axis in a common coordinate system (e.g. the reference coordinate system of the car). The desired attention direction may be estimated to have a maximum, minimum, average, mean, or median angle based on the angles of the multiple attention directions.

The multiple attention directions may be clustered or grouped (e.g. according to their angles or direction axes). A desired attention direction may be estimated from a group with the majority of the multiple attention directions.

In a further implementation, for each respective attention direction of the multiple attention directions, it is possible to determine an angle, a distance, a covered region relative to a scene camera according to the embodiments mentioned above. For the scene camera, statistics related to angles, distances, covered regions of the multiple attention directions may be calculated. At least one scene camera may be selected (i.e. determined) from the at least part of the scene cameras according to the calculated statistics. For example, a sum of the angles of the multiple attention directions related to a scene camera may be calculated. One or more scene cameras having minimal values may be determined as desired cameras.

Step 105 provides at least one scene image of at least one real object captured by the determined at least one scene camera. In an embodiment, the plurality of scene cameras capture a plurality of scene images. Then, at least one scene image captured by the determined at least one scene camera (i.e. desired scene camera) is provided. For example, each of the scene cameras 211-214 captures a respective scene image. The scene camera 214 may be determined as the desired scene camera according to the attention direction 203. The scene image captured by the scene camera 214 may be provided for further processing.

In an embodiment, the step of capturing the plurality of scene images and the step of capturing the user attention data may be synchronized.

In another embodiment, the step of capturing the plurality of scene images and the step of capturing the user attention data are not synchronized. For example, the user attention data may be captured and at least one attention direction is estimated. Then, at least one scene camera is determined according to the at least one attention direction. Afterwards, the determined at least one scene camera captures at least one scene image.

There are many computer vision applications designed for use in or with vehicles which could take advantages of the at least one scene image captured by the determined at least one scene camera mounted to the vehicle.

In an example, it is possible to determine at least one object of interest according to the at least one scene image as shown in the optional step 106. Different potential embodiments related to the determination of the at least one object of interest are described together with FIG. 7 (e.g. for step 702).

It is also optional to perform step 107 to generate purchasing information related to the at least one object of interest. One specific potential embodiment is described together with FIG. 7.

It is further optional to perform step 108 to integrate the at least one object of interest to a digital map.

When a user is driving a car, he or she normally relies solely on his/her ability to remember objects of interest surrounding the car in the environment, e.g. locations of shops of interest, or gas stations with exceptional prices, or the first free parking lot seen for a while. A problem is that a human's memory cannot always be trusted, and locations and details get lost.

According to embodiments, it is possible to add information related to the determined at least one object of interest to a digital map in order to customize the digital map. The information related to the determined at least one object of interest could be location, name, type of the object of interest. The location may be derived from the current location of the car (e.g. from GPS). The location may be further improved (e.g. improving its accuracy) by considering the attention direction and depth information along the attention direction. The depth information may be provided from a depth sensor or from two attention directions or from two optical cameras. For example, the two attention directions may be captured when the vehicle at two positions, which is described in detail below.

A name or a type of the object of interest may be determined from image classification methods based on the captured at least one scene image. For this, known reference image features or objects may be used for the classification.

According to an embodiment, the at least one scene image may be captured after the determination of the at least one scene camera, after the determination of the at least one attention direction, or after the capture of the user attention data. Often, computation and/or processing time is required for the determination of the at least one scene camera, the determination of the at least one attention direction, and/or the capture of the user attention data. A lag between the capture of the user attention data and the capture of the at least one scene image may exist. In reality, the vehicle may move. Therefore, based on embodiments disclosed above, the at least one scene image (i.e. the desired scene camera) may not capture an object of interest indicated by the at least one attention direction provided from the user attention data, and/or the at least one attention direction may not correctly indicate a region of interest where the object of interest is contained in the at least one scene image.

According to the example of FIG. 4, the vehicle is at a first vehicle position where the user attention data is captured. As shown in FIG. 4, the car 201 is at a first position 441 where the user looks at the person 226 and the user attention data is captured. The user attention data is indicative of the user attention direction 203 that may indicate an object of interest (e.g. the person 226). A first coordinate system may be derived from the reference coordinate system of the vehicle at the first vehicle position 441. In FIG. 4, the reference coordinate system 209 is the first coordinate system.

At a later time, the vehicle is at a current vehicle position (i.e. a second vehicle position) where the at least one scene image is captured. A second coordinate system may be derived from the reference coordinate system of the vehicle at the current vehicle position. As shown in FIG. 4, the car 201 is at the current position 442, and the reference coordinate system 449 is the second coordinate system. During the computation and/or processing period for the determination of the at least one scene camera, the determination of the at least one attention direction, and/or the capture of the user attention data, the car 201 has moved from the first position 441 to the current position 442. Based on embodiments disclosed above, the attention direction 443 in the reference coordinate system 449 of the car 201 is determined.

The scene camera 214 may be determined as a desired scene camera accordingly. Then, a scene image is captured by the scene camera 214. However, the attention direction 443 does not accurately indicate the object of interest (e.g. does not indicate the person 226). When the car is at the current position 442, the scene image captured by the scene camera 214 may not contain the object of interest (e.g. the person 226). Similarly, if the car 201 is equipped with an omni-camera, a region of interest in an image of the omni-camera may be determined by the attention direction 443 and the determined region of interest may not contain the object of interest (e.g. the person 226).

In order to address the problems discussed above, according to an embodiment, a vehicle spatial relationship between the vehicle at the first vehicle position 441 and the vehicle at the current vehicle position 442 is considered to determine at least one attention direction and/or at least one scene camera. The vehicle spatial relationship can represent a distance and/or a rotation between the vehicle at the first vehicle position and the vehicle at the current vehicle position.

For example, the vehicle spatial relationship is determined or partially determined according to, but is not limited to, a GPS device, an odometer, a compass, an accelerometer, an inertial sensor, a camera or their combinations, mounted to or contained in the vehicle. For example, a vision based tracking method may analyze one or more images captured by at least one scene camera of the vehicle in order to estimate the motion of the vehicle (from which the vehicle spatial relationship may be derived). Further, the vehicle spatial relationship may be obtained from the speed of the vehicle or the GPS positions and/or orientations of the vehicle (e.g. a compass sensor).

Having the vehicle spatial relationship, the attention direction 443 estimated in the coordinate system 449 associated with the car 201 at the position 442 can be transformed in order to obtain the attention direction 203. The attention direction 203 may also be expressed in the coordinate system 449 to determine the at least one scene camera among the scene cameras 211-214 when the car 201 is at the position 442. In the example shown in FIG. 4, the scene camera 213 may be determined as the desired scene camera, as the field of view of the scene camera 213 contains a certain beginning part (e.g. between 4 and 0.5 meters from the user position) of the attention direction 203. Then, the scene camera 213 is used to capture a scene image that includes the object of interest 226.

Figure 5A:
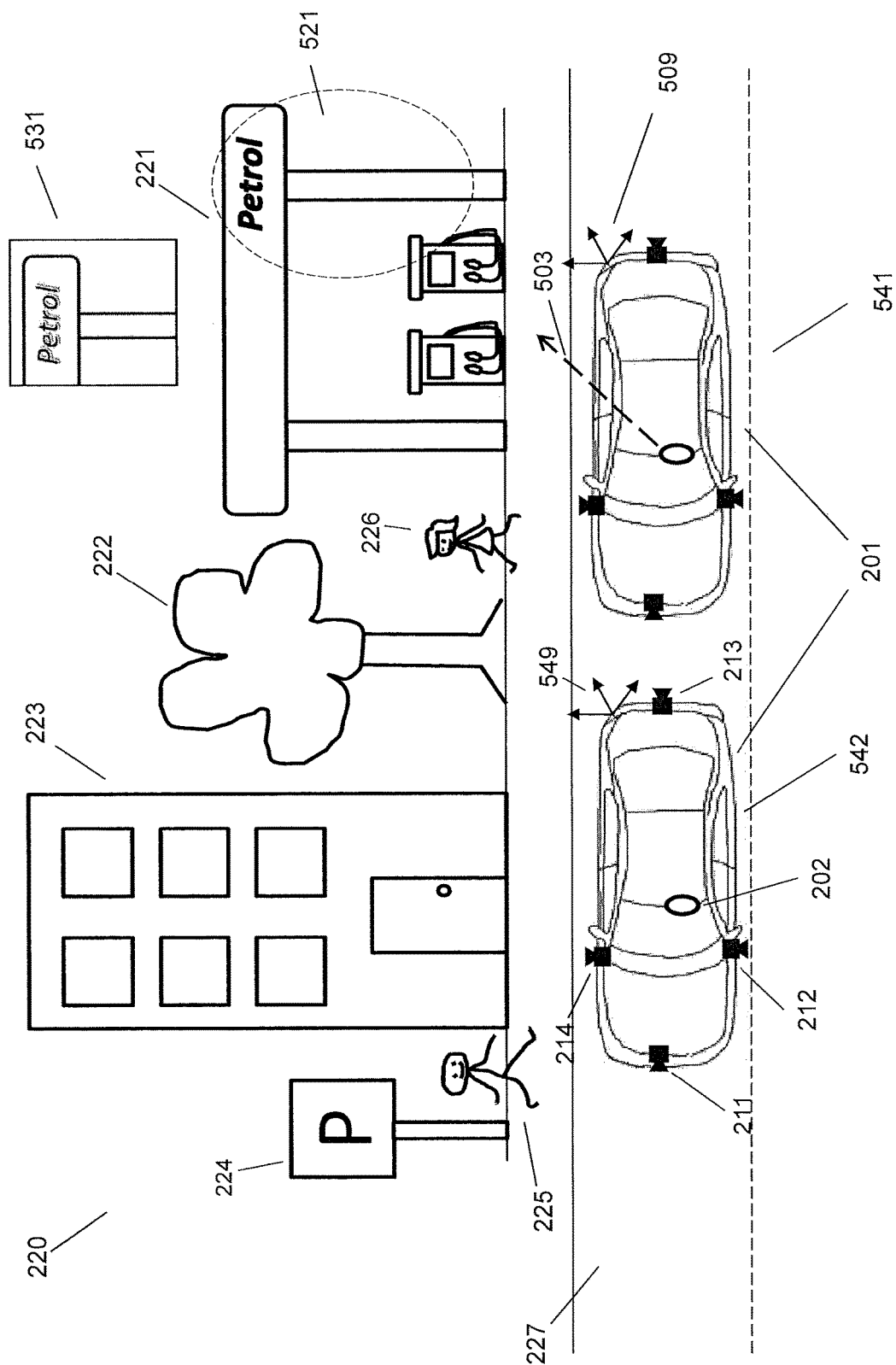
FIGS. 5A and 5B show further exemplary scenarios according to embodiments of the invention.

Blind Spots:

It is also possible that none of the scene cameras mounted to the vehicle satisfies a criterion of the desired scene cameras. Blind spots may exist for the cameras mounted to the vehicle. The area of the blind spots in the vehicle coordinate system may be provided. An example is shown in FIG. 5A, in which the object of interest 521 of the real environment is not covered by any of the scene cameras mounted on the car being at the position 541. In this example, the attention direction 503 related to the object of interest 521 is determined in the coordinate system 509. In one example, none of the scene cameras 211-214 satisfies a criterion of a desired scene camera when the car 201 is at the position 541. For instance, when the car 201 is at the position 541, none of the scene cameras 211-214 has an optical axis with an angle below a certain threshold relative to the attention direction 503, and/or none of the scene cameras 211-214 has a field of view containing a certain part of the attention direction 503. Thus, it is determined that none of the scene cameras can capture the object of interest 521, for example the petrol sign, indicated by the attention direction 503.

In another example, as the area of the blind spots in the coordinate system 509 is known, it could be directly determined that a certain part (e.g. between 4 and 0.5 meters from the user position) of the attention direction 503 is not covered by field of view of any scene cameras. From this, it could be also determined that none of the scene cameras can capture the object of interest 521.

In order to address the problems mentioned above, a scene image might be captured when the vehicle arrives at another position. For example, as shown in the FIG. 5A, the car 201 moves to the position 542. At the position 542, the scene camera 213 may capture a scene image 531 that includes at least part of the object of interest 521 (e.g. the petrol sign). The position 542 may be unknown when the attention direction 503 is determined and the car is at the position 541.

The position 542 (equivalent to a vehicle spatial relationship between the car at the position 541 and at the position 542) is, for example, determined first, and at least one desired scene camera is also determined together with the position 542. Then, at least one scene image is captured by the determined at least one scene camera when the car 201 is at the determined position 542.

One or more criteria of the determination of at least one desired scene camera, as disclosed above, are provided in order to determine the position 542 and the at least one desired scene camera. For example, the criteria may include, but is not limited to, spatial relationships between the attention direction and camera poses of the scene cameras and/or spatial relationships between the attention direction and the field of view of the scene cameras.

In one implementation, the position 542 and/or at least one desired scene camera may be determined in real time during the movement of the car 201. For a new position of the car 201, it is possible to determine if one or more scene cameras satisfy the criteria. In this case, the attention direction 503 is provided in a common coordinate system with the scene cameras mounted to the car being at the new position. For this, a transformation between the car being at the new position and at the position 541 may be required, which could be estimated from methods mentioned above. When at least one scene camera satisfies the criteria, the at least one scene camera is determined as the desired scene camera to capture at least one scene image, and then the new position is determined to be the position 542.

In another implementation, the position 542 and/or at least one desired scene camera are pre-determined according to the position 541. For example, it is possible to test a position for the car and check if one or more scene cameras satisfy the criteria when the car at that position. An environment map (e.g. a city street map) and/or a moving direction of the car may also be considered to choose the position.

Figure 5B:
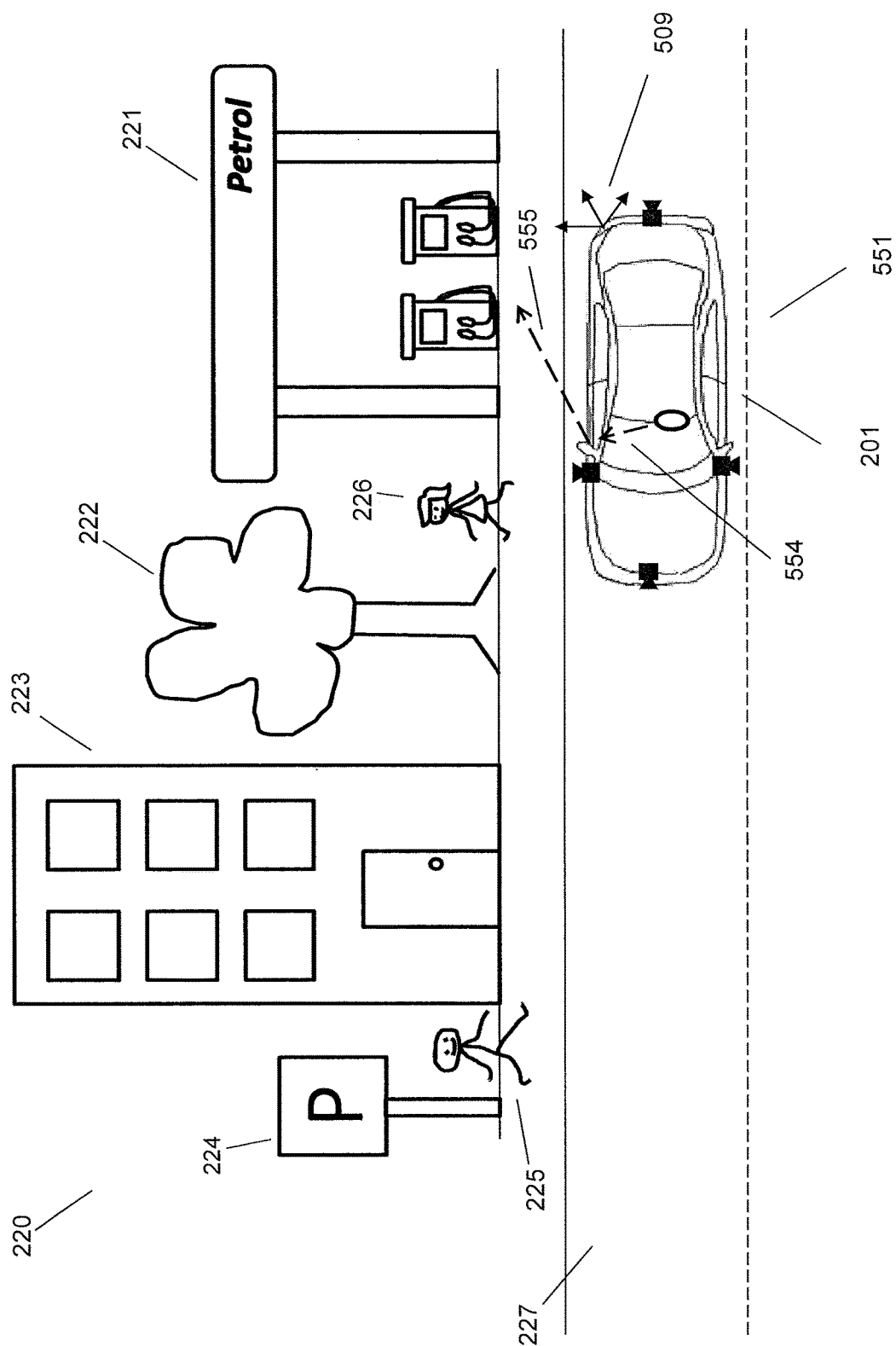

Consideration of rear mirror for the determination of attention directions:

Rear mirrors may also be considered for determining the at least one attention direction. For example, the vehicle often has three mounted rear mirrors. Normally, the user (e.g. a passenger or a driver) may look at one of the rear mirrors of the vehicle in order to look at surrounding objects of interest. Therefore, an attention direction (e.g. a gaze direction or face direction) towards the mirror may not be considered, while a reflected direction by the mirror may be considered to determine at least one scene camera. As one example shown in FIG. 5B, the attention direction 554 is toward a rear mirror and is not used to determine at least one scene camera. The attention direction 555 that is a reflection from the attention direction 554 could be used to determine at least one scene camera according to any method mentioned above.

In an implementation, the attention direction 555 can be estimated according to the attention direction 554 and the pose of the mirror in a common coordinate system (e.g. the reference coordinate system 509) based on light reflection law. The attention direction 554 may be first estimated according to methods proposed in the present invention. The pose of the mirror may be provided or determined by a camera. The attention direction 555 may be determined only if the attention direction 554 intersects with the mirror.

In another implementation, the camera 206 mounted inside the car 201 captures a mirror image containing at least part of the user reflected by the mirror. The attention direction 555 could be estimated directly from the captured mirror image. For example, the camera 206 mounted inside the car 201 captures the eye or at least part of the face of the user through the mirror.

In a further implementation, the attention direction 555 may be derived from the attention direction 554 and the pose of the mirror, e.g. according to light reflection law. The attention direction 555 is used to determine at least one scene camera only if the attention direction 554 intersects with the mirror.

Figure 6:
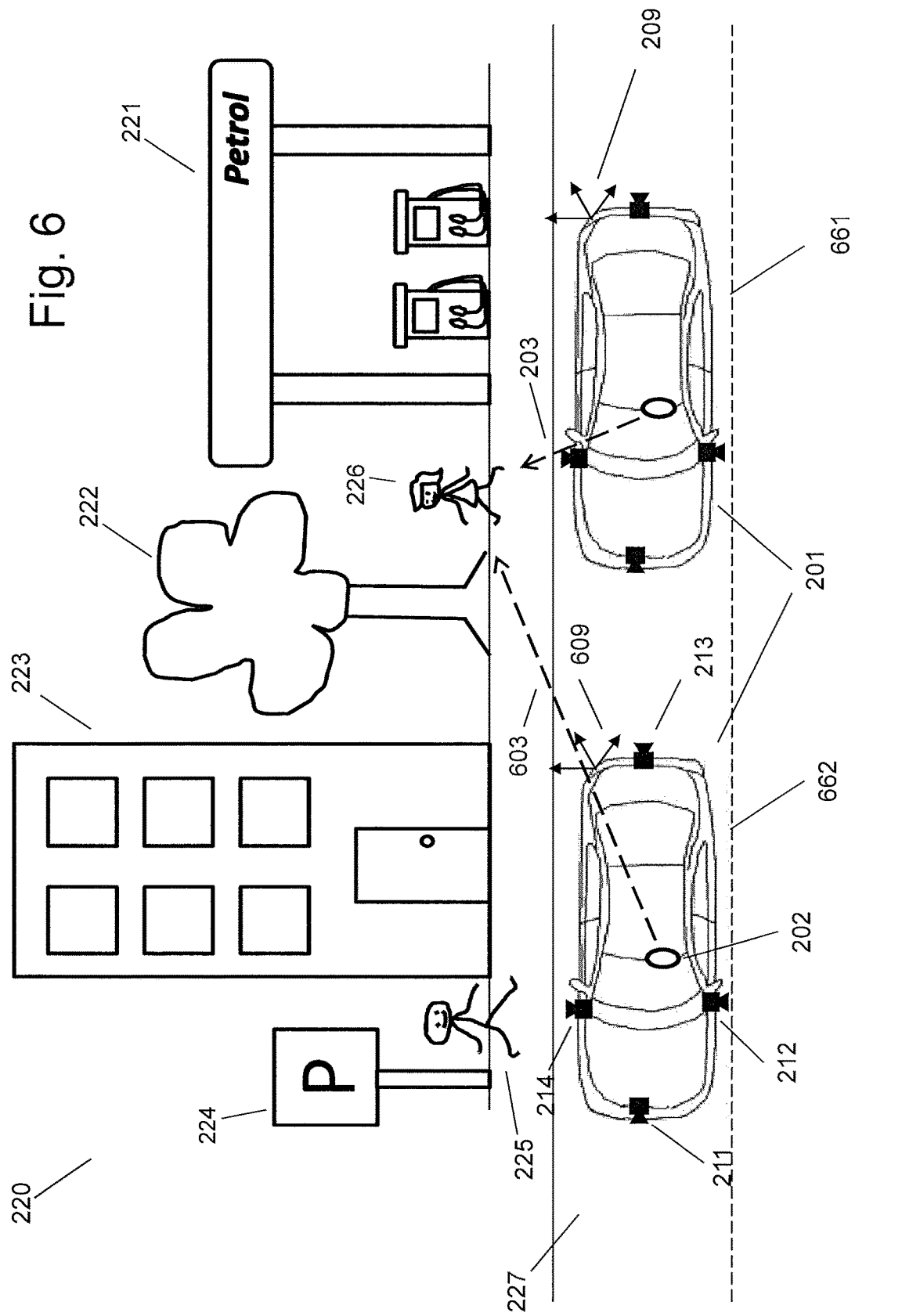
FIG. 6 shows another exemplary scenario according to an embodiment of the invention.

From two attention directions, according to an embodiment, a position may be determined according to triangulation. During a period of the vehicle moving from one position to another position, the user may look at a point or an object of interest multiple times. As an exemplary scenario shown in FIG. 6, the user 202 looks at the person 226 two times, i.e. when the car 201 is at the position 661 and at the position 662, respectively. The attention directions 203 and 603 are determined respectively. The position of the person 226 may be estimated from a triangulation of the attention directions 203 and 603 (e.g. an intersection area or point of the attention directions 203 and 603), and a spatial relationship between the vehicle at the positions 661 and 662. The position of the person 226 may be determined in at least one of the reference coordinate systems 209 and 609 associated with car 201. The position of the person 226 may also be determined in a coordinate system of the real environment 220, for example, when the position of the car is known in the real environment 220.

Figure 7:
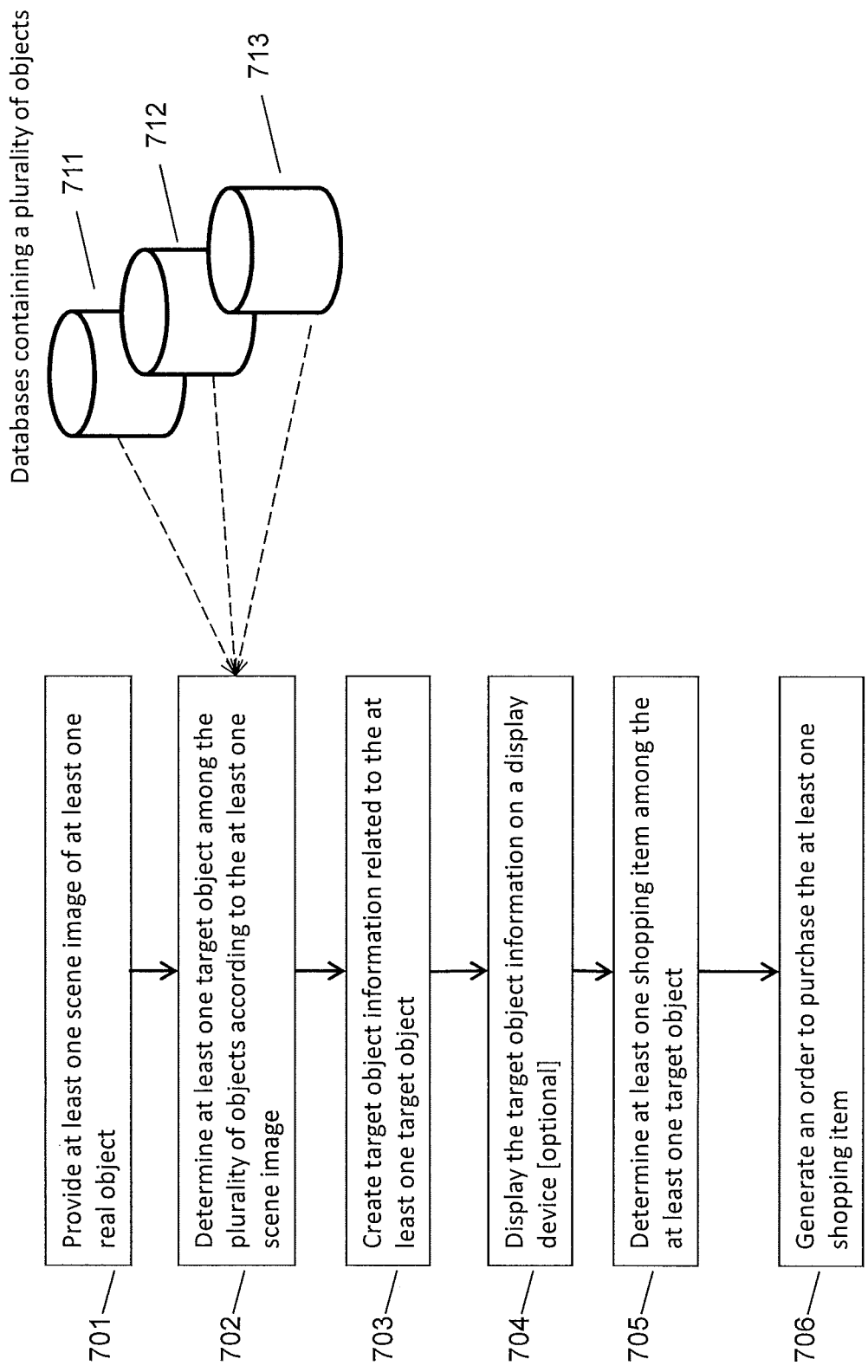
FIG. 7 shows a flow diagram of a method according to a further embodiment of the invention.

FIG. 7 shows an embodiment of a flow diagram of generating an order to purchase at least one item according to at least one scene image captured by at least one scene camera mounted to a vehicle, as disclosed herein. E-commerce and online shopping are common techniques and make life simple for both buyers and sellers. With a computer or even a smart phone, a buyer may find some candidate items (e.g. some objects of interest) for purchasing based on key word searching with modem E-commerce and online shopping system. For example, a user may find an object of interest in a surrounding environment and may like to further find out whether the same object (also called item) and/or similar objects are available for purchasing and then may perform an order to purchase one or more objects and/or find a real store for hands-on checking and/or purchasing. It is possible to capture an image of the object of interest and identify the same or similar items available for purchasing based on image analysis of the captured image.

Nowadays, people also spend a lot of time in a vehicle, for example when they are shopping, commuting or sightseeing. Potentially, there may be many different objects (e.g. pedestrians, advertisement posters, and real stores) surrounding the vehicle. It would be difficult for people sitting in a vehicle to use a mobile device equipped with a camera (e.g. a standard camera or a mobile phone with a camera) to capture an image of the environment surrounding the vehicle. This is particularly true for a driver who is driving the vehicle. The driver is not able to hold the mobile device to capture an image while he is driving.

It is therefore beneficial to employ one or more cameras mounted on a car to capture an image containing an object of interest instead of asking the driver to hold on and take a camera to capture an image. Further, an attention direction of the driver (e.g. a gaze direction or a face direction or a hand pointing direction) may be employed to determine at least one camera among the car mounted cameras and/or determine regions of interest in one or more images captured by at least one of the car mounted cameras.

Again referring to FIG. 7, step 701 provides at least one scene image of at least one real object.

In one example, the at least one scene image may be captured by at least one scene camera mounted on a vehicle. The event of capturing the at least one scene image by the at least one scene camera may be triggered by a user command and/or by a state or state changing of the vehicle. A user command may include at least one of, but is not limited to, clicking a button, a gesture command, and a voice command. The states of the vehicle may include, but are not limited to, speed, state of engine, state of braking system, position of gears, light, distance of another object to the front or rear of the car, open/close state of the driver's door, steering wheel lock, hand break, open/close state of the trunk, or a combination of the above.

When multiple scene cameras mounted on the vehicle are available, one or more cameras among all the vehicle mounted scene cameras may be determined according to at least one user attention direction. This may be realized based on methods and systems disclosed above (e.g. as shown in FIG. 1). The determined cameras (i.e. the at least one scene camera) are used to capture one or more scene images (i.e. the at least one scene image). Said one or more cameras among the scene cameras may also be determined according to a user command and/or by a state or state changing of the vehicle. For example, as shown in FIG. 2, the at least one scene camera may be the camera 214 determined among the cameras 211-214 according to the attention direction 203. In another implementation the camera 214 may also be manually determined by the user (e.g. by a voice command, like "front" or "front camera", given by the driver, or by a button triggering the camera).

In another embodiment, the at least one scene image may be captured by at least one camera attached to a mobile device (e.g. a mobile phone or a tablet). The at least one scene image may be captured by any camera.

Step 702 determines at least one target object among a plurality of objects according to the at least one scene image. The at least one target object may be contained or partially contained in the captured at least one scene image. In the example in FIG. 2, the determined scene camera 214 captures the person 226 in the scene image 231. The clothing (e.g. skirt) of the person 226 (which may be the object of interest or a part of the object of interest indicated by the attention direction 203) may be determined as a target object.

The at least one target object may not be contained in the at least one scene image. For example, the skirt of the person 226 contained in the at least one scene image may not be determined as a target object. However, an image region (e.g. the image region 233 as shown in FIG. 3) in the at least one scene image and containing at least part of the skirt 232 may be analyzed, e.g. its texture or color may be analyzed. The image region 233 may also be determined according to at least one user attention direction (e.g. at least one of gaze directions, face directions, and hand pointing directions.) In one embodiment, the image region may be determined based on a spatial relationship between the least one user attention direction and the camera. For example, the user attention direction 203 (e.g. represented by a direction axis) could be projected as a point or a line in the image 231 captured by the camera 214 based on the spatial relationship between the camera 214 and the user attention direction 203. Various methods are disclosed herein to determine the region of interest in the image 231 according to the project point(s). The image region 233 may be determined accordingly.

One or more objects having similar texture or color as at least part of the image region 233 may be determined as the at least one target object. For example, another skirt, even a shirt, a skirt, cup, a car and/or glasses may be determined as the at least one target object.

One or more of a plurality of objects may be determined to be the at least one target object. The plurality of objects may be provided by one or more databases (e.g. the databases 711-713). In one example, the plurality of objects may include a plurality of shopping items available (e.g. online and/or in real stores) for purchasing. Each respective object of the plurality of objects may be associated with at least one reference image containing the respective object. Further, the respective object may have price information, manufacturer information, location information (e.g. a location for a real store), web link information, type or category information, etc. The plurality of objects are represented by their associated information in any method or system disclosed herein.

The databases 711-713 may be located on a server computer side. For example, an online shop provides, on its online server computer, various clothing items with their reference images and prices, e.g. for skirts, jeans and shirts. The clothing items may be compared to the skirt of the person 226 in terms of their colors, shapes, and/or textures in order to determine at least one of the clothing items as the at least one target object. For this, image based matching or similarity measures could be employed for the comparison, e.g. match the image 231 or only the image region 233 with the reference images associated with the clothing items.

In one embodiment, it is possible to automatically determine one or more target objects among the plurality of objects based on matching the at least one scene image with at least part of reference images associated with the plurality of objects. One or more reference images that are matched with the at least one scene image could be determined. Then respective objects related to the matched reference images can be determined as target objects. The image matching may be based on, e.g., image features (e.g. SIFT; SURF), template matching, histogram, texture model (e.g. co-occurrence matrices, wavelets), and/or machine learning (e.g. random forest).

A computer vision method may be applied to detect at least one object in the at least one scene image based on pixel information of the scene image and further determine a type or a class of the at least one object. For example, the skirt 232 may be detected in the scene image 231 and recognized as a type of cloth. The determined type may be used to select target objects among the plurality of objects. For example, objects that have the type of cloth may be determined as target objects. In another example, reference images related to objects that have the type of cloth may be matched to the at least one scene image.

At least one image region contained in the at least one scene image may be chosen manually by the user or automatically (e.g. according to computer vision methods). The chosen image region may be matched to the reference images related to the plurality of objects. In one implementation, the image region 233 in the scene image 231 may be manually chosen by the user. In another implementation, the image region 233 in the scene image 231 may be automatically determined based on a computer vision method or based on one or more user attention directions.

In one embodiment, the plurality of objects includes a plurality of clothing items. The plurality of clothing items may be provided from one or more databases. For example, one or more clothing providers (e.g. cloth manufacturers and/or (online) shopping stores) could provide clothing items. Each of the plurality of clothing items may have associated texture information, shape, size, reference image features (e.g. represented by visual words, SIFT features and/or SURF features) and/or a reference image containing the respective clothing item. The plurality of clothing items (represented by their associated information) may be stored in the vehicle, or in one or more server computers separate from the vehicle. A mobile device (e.g. a mobile phone, a tablet, or a laptop) may store the plurality of clothing items. The vehicle, the mobile device, and the one or more server computers may communicate with each other via cables and/or wirelessly.

The step 702 of determining the at least one target object or a part of the step 702 may be performed in the vehicle, in the server computer, or in the mobile device. As an example scenario shown in FIGS. 2 and 3, the scene image 231 is captured. The plurality of clothing items (represented by their associated information) may be stored in the server computer 301. The following computation of determining a target object may be performed in the server computer 301. In this case, the scene image 231 may be sent from the car 201 to the server computer 301. In another example, the scene image 231 may be sent from the car 201 to the mobile phone 302, and then sent from the mobile phone 302 to the server computer 301. Multiple scene images may be captured by cameras mounted to the car and used to determine one target object.

A vision based visual search method like that disclosed in Girod, Bernd, et al. "Mobile visual search." Signal Processing Magazine, IEEE 28.4 (2011): 61-76 or Philbin, James, et al. "Object retrieval with large vocabularies and fast spatial matching." Computer Vision and Pattern Recognition, 2007. CVPR'07. IEEE Conference on. IEEE, 2007 (e.g. based on image features, similarity measures, template matching, and/or machine learning) may be performed in order to search, among the plurality of clothing items, one or more clothing items that have visual information (e.g. texture, color, and/or shape) similar or relevant to at least part of the scene image 231 (e.g. the region of interest 233) or to an object contained in the scene image 231 (e.g. the skirt 232). For this, at least part of the image 231 could be matched with reference image features or reference images associated with the plurality of clothing items.

It is optional to recognize an object of interest and/or determine a region of interest contained in the scene image. For example, the scene image 231 is analyzed automatically. For instance, an object recognition/classification method is performed on the scene image 231 in order to determine an object of interest or a region of interest. A machine learning method (e.g. based on random forest) could be employed to train the recognition/classification method (or system) to detect objects of interest by providing a plurality of training images containing different objects of interest (e.g. different kinds of skirts). It is possible to recognize the skirt 232 in the scene image 231 and/or determine the image region 233 containing at least part of the skirt 232 based on the trained recognition/classification method. The plurality of training images may come from scene images captured previously by the scene cameras mounted to the car 201. This could automatically generate a customized trained method based on favorites of the user. It is also possible to manually recognize the skirt 232 and/or the image region 233 in the scene image 231 by a user input.

When at least one object of interest in the scene image and/or its type is recognized, this information may be provided to search at least one target object. For example, among the plurality of clothing items, only skirts may be considered as potential target objects and other clothing items are excluded from subsequent searching. For example, a skirt among the plurality of clothing items having similar color or texture as the skirt 232 may be determined based on an image matching method.

In one implementation, current image features are extracted in the scene image 231. The current image features may be extracted only in the determined region of interest (e.g. the image region 233). The extracted current image features may be matched with the reference image features associated with at least part of the plurality of clothing items in order to determine one or more clothing items as target objects. Image features may be represented by high level feature descriptors, like SIFT or SURF.

In another implementation, an image region 233 contained in the scene image 231 may be matched to reference images associated with at least part of the plurality of clothing items based on template matching in order to determine one or more clothing items as target objects. Various similarity measures, e.g. NCC, SSD and/or histogram, may be employed for the template matching. From a vision based visual search method (like the methods disclosed above), any clothing items having the same or similar visual texture and/or color may be determined as a target object. For example, the target object is not limited to be a skirt, but could also be a shirt or a skirt. Further, objects relevant to the recognized object (e.g. the recognized skirt 232) may be determined. For example, a special washing detergent or a lipstick having a similar color may be relevant to the recognized skirt 232. This may require the special washing detergent or the lipstick to be included in the plurality of objects.

Additional preference data may be provided in order to determine the at least one target object. Preference data may include at least one of, but are not limited to, an image and/or text database of preferred target objects, online shop member information, properties related to the vehicle (e.g. type, color, brand, registration year, maintenance status, gas or diesel). For example, the online shop member information may be used to determine which server computers or databases should be used to provide the plurality of objects or a part of the plurality of objects. Further, the properties related to the vehicle may be used to determine items related to vehicles. For example, tires or painting material that could be used for the type of the vehicle may be searched or determined as target objects.

Step 703 creates target object information related to the at least one target object. Target object information related to the determined at least one target object may be created. In one example, one or more skirts among the plurality of clothing items may be determined as the at least one target object. The skirts may come from one or more clothing providers. The target object information includes at least one of images containing the determined at least one target object, sizes, materials, prices, brands, clothing providers, online information links, and/or online store links related to the determined at least one target object. In the example scenario shown in FIG. 3, the target information may be created in the server computer 301 and sent from the server computer to the car 201 and/or the mobile phone 302.

Optional step 704 displays the target object information on a display device. The target object information may be displayed on a display device, e.g. a LCD screen. The display device may be attached to the vehicle or separate with the vehicle. The display device may be a screen mounted inside the vehicle. The display device may also be a screen of a mobile device or a desktop computer.

Step 705 determines at least one shopping item among the at least one target object. The user may choose one or more target objects as shopping items from the determined at least one target object. The user input may include some user preferences, e.g. a maximum price limit and particular brands.

Step 706 generates order information to purchase the at least one shopping item. Personal data related to a user, e.g. a postal address, payment information (e.g. credit card information, voucher, and/or virtual currency), contact information, and membership information (e.g. membership of an online or real store) may be considered for generating the order information. In the example scenario shown in FIG. 3, the order information may be generated in the server computer 301, the car 201 or the mobile phone 302. The order information may be submitted to an ordering server computer, which may be different from or the same as the server computer 301. For example, the server computer 301 may be a server providing information of a plurality of items available for purchasing. The ordering server computer may be an online shop that sells respective items. In another example, the server computer 301 may provide information of a plurality of items available for purchasing and sell the plurality of items.

Any embodiments described above can be applied, in principle, to any device to which a plurality of cameras is mounted, for determining at least one camera among the plurality of cameras. For example, a mobile device, such as a laptop or a tablet computer, may be equipped with a front-facing camera and two back-facing cameras. The front-facing camera may be used to determine a user attention direction, such as a gaze direction and/or face direction. The determined gaze direction and/or face direction can be used to select a desired camera from the two back-facing cameras. Images captured by the desired camera may contain objects of interest indicated by the user attention.

The present disclosure is further related to the following aspects and embodiments. These aspects and embodiments may be applied individually and separately or in combination with aspects and embodiments of the disclosure as described herein.

A method of determining at least one item available for purchasing, the method comprising: a) providing at least one scene image captured by at least one scene camera mounted to a vehicle; b) providing user attention data related to at least one user captured by an information capturing device; c) providing, from the user attention data, at least one attention direction relative to a reference coordinate system associated with the vehicle; d) providing image information related to each of a plurality of items available for purchasing, wherein the image information comprises at least one of reference images and reference image features; and e) determining at least one item of the plurality of items according to the at least one attention direction, the at least one scene image, and the image information related to the at least one item.

The method according to the preceding paragraph, further comprising selecting the at least one scene camera among a plurality of scene cameras mounted to the vehicle according to the at least one attention direction.

The method according to one of the preceding paragraphs, further comprising determining at least one current image features in the at least one scene image.

The method according to one of the preceding paragraphs, further comprising determining at least one current image features in the at least one scene image further according to the at least one attention direction.

The method according to one of the preceding paragraphs, wherein the step e) further comprises matching at least part of the at least one scene image and at least part of reference images of the image information related to the at least one item or matching at least one current image features and at least part of reference image features of the image information related to the at least one item.

The method according to one of the preceding paragraphs, further comprising providing purchasing information related to the at least one item.

For a majority of applications in computer vision, images are captured by one or more cameras, an operator is a human being, and a display screen is used to display the images such that the human being could observe the images and move the camera accordingly. In this case, a user attention direction relative to the screen indicates objects of interest that should be recognized, reconstructed, and/or tracked. Image features unrelated to the objects of interest could be removed from all extracted image features or only image features related to the objects of interest are extracted according to the user attention direction. For example, a gaze direction or a face direction or a hand direction relative to the screen could be used to identify objects of interest and/or relevant image features contained in the images for recognition, reconstruction, and/or tracking applications. In another example, a spatial relationship between at least one user attention direction and a camera could also be used to determine image features contained or derived from images captured by the camera.

Further, the image location of the user attention direction (e.g. gaze direction or the frontal face direction) in the image could be used to determine image features of interest contained in the image. In another example, the screen location of the user attention direction on the screen could be used to determine image features of interest. The screen location may be determined as an intersection between the screen plane and the user attention direction (e.g. the direction of the gaze or the face). The screen locations of the user attention directions may be transformed to image locations in the image according to where the image is display on the screen. These image locations would represent the image locations of the user attention directions.

Augmented reality systems could present enhanced information of a real object by providing a visualization of overlaying computer-generated virtual information with visual impressions or an image of the real object. For this, a real object is detected or tracked in order to retrieve or generate the relevant virtual information. The overlay of the virtual and real information can be seen by a user using a well-known video see-through device comprising a camera and a display screen. In this case, the object of interest is captured in an image by the camera. The overlay of the virtual information and the captured image is shown on the display screen to the user. The user often looks at the object of interest captured in the image displayed on the screen, but not at other objects captured in the image. Thus, the gaze information of the user or a pose of the user's face relative to the screen or the camera can determine the object of interest.

In another embodiment, the overlay of the virtual and real information can be seen by a user in a well-known optical see-through device having semi-transparent glasses. In this case, the user sees through the semi-transparent glasses real objects of the real environment augmented with the virtual information blended in in the semi-transparent glasses. At least one camera is often attached to the optical see-through device in order to identify, track or reconstruct the object of interest by using computer vision methods. In this case, a spatial relationship between the camera attached to the optical see-through device and the user attention direction could be used to determine or detect image features in images captured by the camera. The image locations of the user attention directions in one image captured the camera could be determined according to that spatial relationship.

Having the image positions of the user attention directions in one image, image features contained the image may be determined according to an image region of interest defined by the image positions of the user attention directions.

For conciseness, some embodiments given here are based on gaze image locations. However, all the embodiments related to gaze image locations could also be applied to the image positions of other user attention directions, e.g. face direction image locations, and hand pointing direction image locations.

According to an embodiment, the step of determining at least one image feature of interest comprises determining an image region of interest in at least one image according to the at least one gaze image location, wherein the at least one image feature of interest is determined according to the image region of interest. The at least one image feature of interest may comprise information of at least part of pixel information of the image region of interest or information derived from at least part of pixel information of the image region of interest.

According to an embodiment, the step of determining the image region of interest comprises performing a segmentation on the at least one image to obtain a plurality of image regions and determining at least one of the plurality of image regions as the image region of interest according to the at least one gaze image location and the positions of the at least one of the plurality of image regions.

Image segmentation may be performed to segment an image region of interest in the image from the at least one gaze image location as one or more seed points.

The image region of interest may also be determined as surrounding regions (e.g. represented by various 2D geometrical shapes) around the at least one gaze image location. For example, a circle or a rectangle or a square could be determined based on one or more gaze image locations, as a center point, or as corner points, or as points on boarders to restrict the 2D geometrical shape.

Many Augmented Reality (AR) applications can benefit from the present invention. For example, in AR shopping, AR maintenance, and AR touring applications, there are multiple real objects located in the real world (e.g. clothing for AR shopping, engine components for AR maintenance, and monuments for AR touring). The user is often interested in one object at a time. The object of interest to the user could be determined according to the user attention direction, e.g. the gaze of the user, the pose of the face, or a hand pointing direction at that time. Then, only the object of interest may be detected, tracked, or reconstructed. Further, digital information related only to the object of interest would be generated and visually displayed on the top of an image of the object in an AR view.

According to an embodiment, a processing system for performing a method as described herein may be comprised at least in part in a handheld device, in the vehicle, and/or in a server computer. Such processing system may be comprised in only one of these devices or may be a distributed system in which one or more processing tasks (performing one or more method steps) are distributed and processed by one or more processing devices (such as microprocessors) which are spatially distributed and are communicating with each other, e.g. wirelessly.

Generally, the following aspects and embodiments may be applied individually or in any combination with each other with the aspects of the invention as disclosed above.

According to an embodiment, the user attention data is related to at least one or more of a face, a gaze, a hand, and a gesture of the user.

According to an embodiment, the user attention data comprises at least one or more of an optical image, bioelectric signal, e.g. electrooculogram.

According to an embodiment, the information capturing device comprises a user camera, and the step of providing user attention data comprises providing at least one user image of at least part of the user captured by the user camera.

For example, the at least one user image further comprises at least part of the vehicle, and the at least one attention direction is determined according to pixel information of the at least part of the user and pixel information of the at least part of the vehicle in the at least one user image.

According to an embodiment, the information capturing device comprises an eye tracking device, and the step of providing user attention data comprises providing at least one gaze information associated to at least one eye of the user captured by the eye tracking device.

According to an embodiment, the step of providing the at least one attention direction comprises at least one or more of: determining at least one face direction of the user's face, determining at least one gaze direction of a user's gaze, and determining at least one hand pointing direction of a user's hand.

According to an embodiment, the method further comprises providing a device position of the information capturing device in the reference coordinate system, and providing the at least one attention direction relative to the reference coordinate system according to the device position and a spatial relationship between the at least one attention direction and the information capturing device.

According to an embodiment, the step of providing the at least one image of at least one real object captured by the at least one of the scene cameras comprises providing a plurality of images captured by the plurality of scene cameras and selecting the at least one image from the plurality of images.

For example, the step of providing the plurality of images and the step of providing the user attention data are synchronized.

According to an embodiment, the step of providing the at least one image comprises capturing the at least one image by the at least one of the scene cameras.

According to an embodiment, the attention direction is determined in consideration of at least one mirror mounted on the vehicle.

According to an embodiment, the method further comprises capturing the user attention data when the vehicle is at a first vehicle position, determining a spatial relationship between the vehicle at the first vehicle position and the vehicle at a second vehicle position different from the first vehicle position, and determining the at least one of the scene cameras according to the spatial relationship between the vehicle at the first vehicle position and the vehicle at the second vehicle position.

According to an embodiment, the method further comprises capturing a second user attention data when the vehicle is at the second vehicle position, determining at least one second attention direction from the second user attention data, and determining a position data in the reference coordinate system associated with the vehicle according to the at least one attention direction, the at least one second attention direction and the spatial relationship between the vehicle at the first vehicle position and the vehicle at the second vehicle position.

According to an embodiment, the at least one attention direction is represented by an axis or field of view.

According to an embodiment, the method further comprises determining at least one object of interest according to the at least one image, wherein the at least one object of interest is contained in the at least one image, or is not contained in the at least one image.

According to an embodiment, the method further comprises determining at least one object of interest according to the at least one image, and generating an order information related to the at least one object of interest for transmission to a provider for purchasing of a product.

According to an embodiment, the method further comprises determining at least one object of interest according to the at least one image, and determining a location of the vehicle in the real world with respect to a global coordinate system and a position of the at least one object of interest relative to the vehicle.

The present disclosure is further related to the following aspects and embodiments. These aspects and embodiments may be applied individually and separately or in combination with aspects and embodiments of the disclosure as described herein.

According to an aspect, there is disclosed a method of determining at least one image feature in at least one image, comprising providing at least one image of at least part of an object captured by at least one camera, displaying at least part of the at least one image on at least one display screen, determining at least one attention image location of at least one user in the at least one image, and determining at least one image feature of interest in the at least one image according to the at least one attention image location.

According to another aspect, there is disclosed a method of determining at least one image feature in at least one image, comprising providing at least one image of at least part of an object captured by at least one camera, determining at least one attention direction of at least one user with respect to the at least one camera where the at least one image is captured, determining at least one attention image location of at least one user in the at least one image according to the at least one attention direction, and determining at least one image feature of interest in the at least one image according to the at least one attention image location.

According to another aspect, there is disclosed a system for determining at least one image feature in at least one image, comprising a processing system which is configured to provide at least one image of at least part of an object captured by at least one camera, to display at least part of the at least one image on at least one display screen, to determine at least one attention image location of at least one user in the at least one image, and to determine at least one image feature of interest in the at least one image according to the at least one attention image location.

According to another aspect, there is disclosed a system for determining at least one image feature in at least one image, comprising a processing system which is configured to provide at least one image of at least part of an object captured by at least one camera, to determine at least one attention direction of at least one user with respect to the at least one camera where the at least one image is captured, to determine at least one attention image location of at least one user in the at least one image according to the at least one attention direction, and to determine at least one image feature of interest in the at least one image according to the at least one gaze attention image location.

Particularly, according to the present disclosure, a gaze direction of a user's eye or eyes is an attention direction of the user. A gaze screen location is an attention screen location. A gaze image location is an attention image location.

Particularly, according to the present disclosure, a face direction of a user is an attention direction of the user. A face direction screen location is an attention screen location. A face direction image location is an attention image location.

According to an embodiment, the face direction is the frontal face direction.

Particularly, according to the present disclosure, a hand pointing direction of a user is an attention direction of the user. A hand pointing screen location is an attention screen location. A hand pointing image location is an attention image location.

For conciseness, embodiments given here are based gaze directions, gaze screen locations, gaze image positions as specific examples of the attention direction of the user, the attention screen location, the attention image location.

However, all the embodiments related to the gaze directions, the gaze screen locations, the gaze image positions could also be applied to other user attention directions, e.g. face directions and hand pointing directions, other user attention screen locations, e.g. face direction screen locations and hand pointing screen locations, and other user attention image locations, e.g. face direction image locations and hand pointing image locations.

Particularly, according to the present disclosure, a gaze image location of human eyes, particularly of the user's eye or eyes, in one or more images may be detected and used to determine image features in the one or more images. The extracted image features may be used to detect, track, and/or reconstruct objects of interest captured in the one or more images. Thus, unrelated detected image features may be removed or only image features of interest may be detected in images for use in computer vision methods.

For a plurality of applications in computer vision, based on images captured by one or more cameras, an operator of a method or system, as described according to the present disclosure, is a human being, and a display screen is used to display the images such that the human being could observe the captured images and move the camera accordingly. In such an embodiment, a gaze location of human eyes of the user in the images may indicate objects of interest that should be recognized, reconstructed, and/or tracked. Image features unrelated to objects of interest may be removed from any extracted image features, or only image features related to objects of interest may be extracted according to the determined gaze location or gaze locations, or any identified objects of interest in a computer vision method for recognition, reconstruction, and/or tracking.

Augmented reality systems could present enhanced information of a real object by providing a visualization of overlaying computer-generated virtual information with visual impressions or an image of a real object. For this, the real object is detected or tracked in order to retrieve or generate the relevant virtual information. The overlay of the virtual and real information can be seen by a user, e.g., by employing a video see-through device comprising a camera and a display screen. In this case, the object of interest is captured in an image by the camera. The overlay of the virtual information and the captured image is shown on the display screen to the user. The user would often look at the object of interest captured in the image displayed on the screen, but not at other objects captured in the image. Thus, the gaze information of the user may be used to determine an object of interest.

The overlay of the virtual and real information can also be seen by a user by means of a well-known optical see-through device having semi-transparent glasses. In this case, the user then sees through the semi-transparent glasses objects of the real environment augmented with the virtual information blended in, in the semitransparent glasses. At least one camera is often attached to the optical see-through device in order to identify, track or reconstruct the object of interest by using computer vision methods.

According to an embodiment, the method further comprises determining at least one gaze screen location of the at least one eye on the at least one display screen, wherein the at least one gaze image location is determined according to the at least one gaze screen location.

For example, it further comprises synchronizing the step of determining the at least one gaze screen location with the step of displaying the at least part of the at least one image on the at least one display screen.

According to an embodiment, the step of determining the at least one gaze image location comprises providing at least one second image of the at least one eye captured by at least one capturing device (which may be the same camera or a different camera) that has a known spatial relationship with the at least one display screen, and determining the at least one gaze image location according to the at least one second image.

According to a further embodiment, the at least one image comprises a plurality of images captured by the at least one camera, and the method further comprises, for each respective image of the plurality of images, displaying at least part of the respective image on one of the at least one display screen and determining one or more gaze image locations in the respective image. The method then further comprises determining at least one image transformation between the plurality of images, and transforming the determined one or more gaze image locations from the each respective image of the plurality of images into at least one of the plurality of images according to the at least one image transformation, wherein the determined at least one gaze image location comprises the transformed gaze image locations.

According to an embodiment, the method further comprises providing depth information associated with at least part of the at least one image, and determining the at least one gaze image location according to the at least one gaze direction and the depth information.

According to an embodiment, the method further comprises performing a computer vision algorithm according to the determined at least one image feature, wherein the computer vision algorithm comprises at least one of image based recognition, image based tracking, image based reconstruction, and image based classification.

According to an embodiment, the method further comprises matching the at least one image feature of interest with reference image features and recognizing the object according to the matching.

According to a further embodiment, the method comprises matching the at least one image feature of interest with reference image features and estimating a pose of the at least one camera with respect to the object according to the matching, wherein the reference image features have 3D positions.

According to an embodiment, the method further comprises providing depth information associated with the at least one image, and determining a 3D position for the at least one image feature of interest according to the depth information.

According to an embodiment, the at least one image is at least one first image, and the method further comprises providing at least one second image, determining at least one second image feature in the second image corresponding to the at least one image feature of interest, and determining a 3D position for the at least one image feature of interest according to image positions of the at least one second image feature and the at least one image feature of interest.

According to an embodiment, the at least one gaze image location is at least one first gaze image location, and the step of determining the at least one second image feature in the at least one second image comprises displaying at least part of the at least one second image on at least one display screen, determining at least one second gaze image location of at least one eye in the at least one second image, and determining the at least one second image feature in the at least one second image according to the at least one second gaze image location.

According to another embodiment, the at least one gaze direction is at least one first gaze direction and the at least one gaze image location is at least one first gaze image location, wherein the step of determining the at least one second image feature in the at least one second image comprises determining at least one second gaze direction of at least one eye with respect to the at least one camera where the at least one camera captures the at least one second image, determining at least one second gaze image location of at least one eye in the at least one second image according to the at least one second gaze direction, and determining the at least one second image feature in the at least one second image according to the at least one second gaze image location.

For example, the at least one image feature of interest may be stored in a processing device.

According to an embodiment, the object is a real object and the at least one camera is at least one real camera. According to another embodiment, the object is a virtual object and the at least one camera is at least one virtual camera.

According to an embodiment, the step of determining the at least one image feature of interest comprises determining an image region of interest in the at least one image according to the at least one gaze image location, wherein the at least one image feature of interest is determined according to the image region of interest. The at least one image feature of interest may comprise information of at least part of pixel information of the image region of interest or information derived from at least part of pixel information of the image region of interest.

According to an embodiment, the step of determining the image region of interest comprises performing a segmentation on the at least one image to obtain a plurality of image regions and determining at least one of the plurality of image regions as the image region of interest according to the at least one gaze image location and the positions of the at least one of the plurality of image regions.

For example, the step of determining the image region of interest comprises performing a segmentation on the at least one image according to the at least one gaze image location and pixel information of at least part of the at least one image.

According to an embodiment, the at least one gaze image location contains at least two gaze image locations and the step of determining the image region of interest comprises clustering the at least two gaze image locations and determining the image region according to the result of the clustering.

For example, the step of determining the at least one image feature of interest according to the image region of interest comprises extracting the at least one image feature of interest in the image region of interest.

The step of determining the at least one image feature of interest according to the image region of interest may comprise extracting a plurality of image features in the at least one image, and selecting the at least one image feature of interest from the extracted plurality of image features, wherein the extracted plurality of image features comprises at least one image feature of the object and at least one image feature unrelated to the object.

For example, the processing system according to the invention is comprised, at least in part, in a mobile device (such as a mobile phone, wearable computer, tablet computer, mobile computer, often called laptop, or a head mounted display, such as used for optical see-through augmented reality applications) and/or in a server computer adapted to communicate with the mobile device. The processing system may be comprised in only one of these devices, e.g. in the mobile device or in the server computer, or may be a distributed system in which one or more processing tasks are distributed and processed by one or more processing devices which are distributed and are communicating with each other, e.g. by point to point communication or via a network.

According to an embodiment, the system comprises a mobile device which comprises one or more cameras and, for example, a display screen.

Any steps, embodiments, aspects and examples described herein with respect to the method can equally and analogously be implemented by the processing system being configured (by software and/or hardware) to perform the respective steps, embodiments, aspects or examples. Any processing device used within the processing system may be configured as such and communicate via a communication network, e.g. via a server computer or a point to point communication, with one or more cameras, displays and/or any other components.

According to another aspect, the invention is also related to a computer program product comprising software code sections which are adapted to perform a method according to the invention. Particularly, the software code sections are contained on a computer readable medium which is non-transitory. The software code sections may be loaded into the memory of one or more processing devices (such as microprocessors) as described herein.

Any used processing devices may communicate via a communication network, e.g. via a server computer or a point to point communication, as described herein.

Eye tracking as such is a well-established technology for detecting the position or direction of gaze (where one is looking) or the motion or position of an eye relative to a reference position, e.g. the head. Many eye tracker systems are commercially available, like systems produced by Tobii technology (e.g., see http://www.tobii.com).

An eye tracker system may also be a camera that could capture images of the eye. Gaze detection could also be performed using the captured images, like that proposed in Blum, Tobias, et al. "The effect of out-of-focus blur on visual discomfort when using stereo displays." Mixed and Augmented Reality (ISMAR), 2010 9th IEEE International Symposium on. IEEE, 2010 (hereinafter "Blum et al.").

Many applications have benefited from gaze detection. For example, WO 2014/052058 A1 discloses obtaining a 3D gaze position from an estimated 2D gaze position of a user on a display screen by using a Tobii eye tracker. In their application, artificial out-of-focus blur would be added to images displayed on the screen according to the 3D gaze position. WO 2014/052058 A1 further discloses a solution to improve the visualization, while they do not propose or motivate any method to process or analyse an image of a real environment captured by a camera according to the gaze position. Particularly, WO 2014/052058 A1 does not propose detecting image features in the image according to the gaze position and then perform computer vision methods to track, recognize, classify and/or reconstruct a real object contained in the image.

Srinivasan et al. in reference [16] develop a multi-modal touch screen emulator based on detected gaze positions of one or more eyes on a display screen and gestures of one or more hands. They use a camera to capture the one or more eyes in order to determine the gaze positions on the display screen.

None of these prior art references disclose a relationship between the user gaze position or direction and an object of interest when the user is involved to conduct or use a computer vision product or method based on images that contain the object of interest and that such a relationship could be employed in the computer vision product or method.

Figure 8:
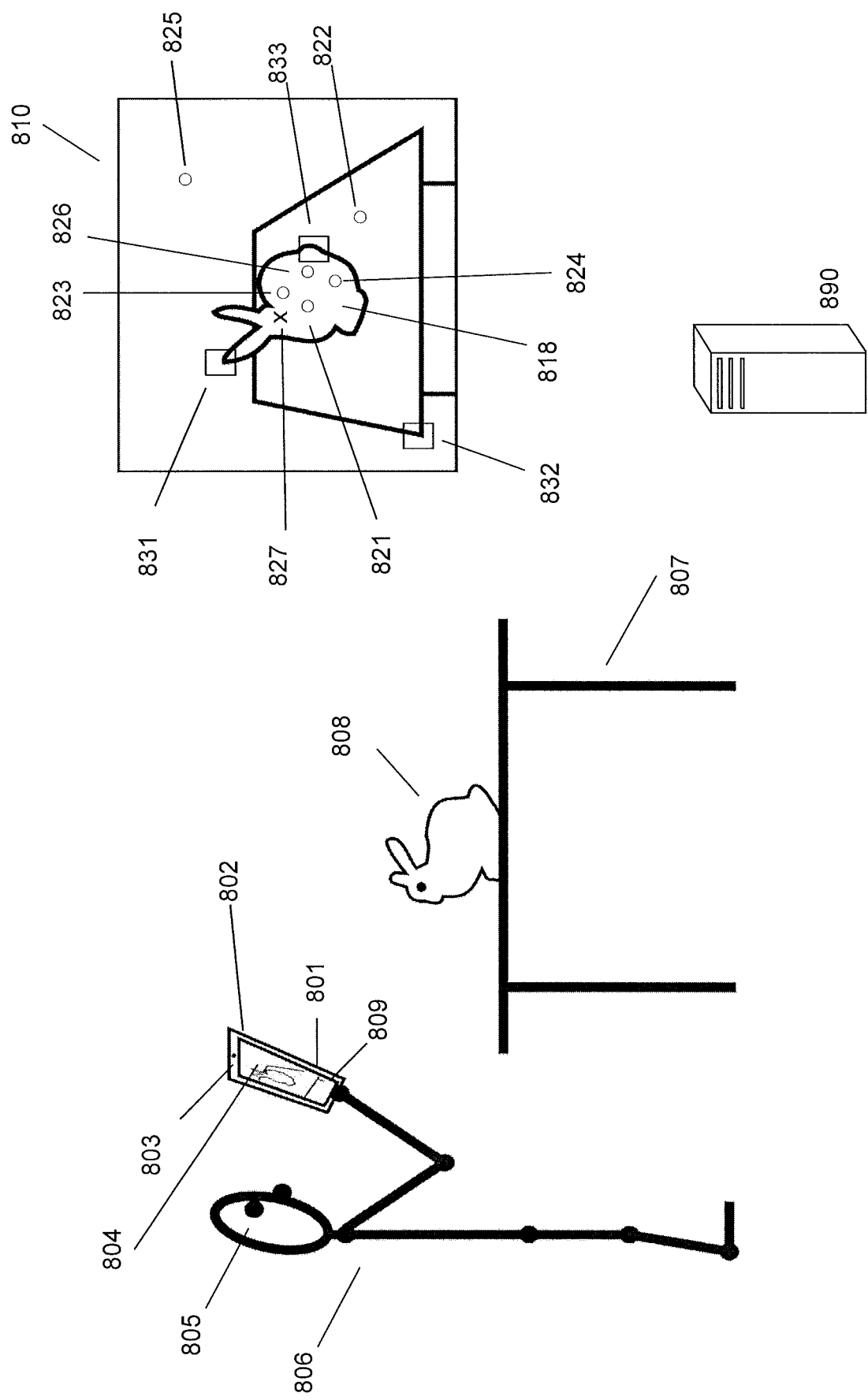
FIG. 8 shows a scenario of a user holding a mobile device that has a front facing camera, a back facing camera, and a display screen for recognizing, tracking and/or reconstructing an object of interest.

FIG. 8 shows a scenario with a user 806 holding a mobile device 801 that has a front facing camera 803, a back facing camera 802, and a display screen 804. An image 810 is captured by using the back facing camera 802 in order to recognize, track and/or reconstruct a plastic rabbit 808 (the object of interest in this embodiment) placed on a table 807. The mobile device 801 includes one or more processing devices 809, such as one or more microprocessors.

Figure 9:
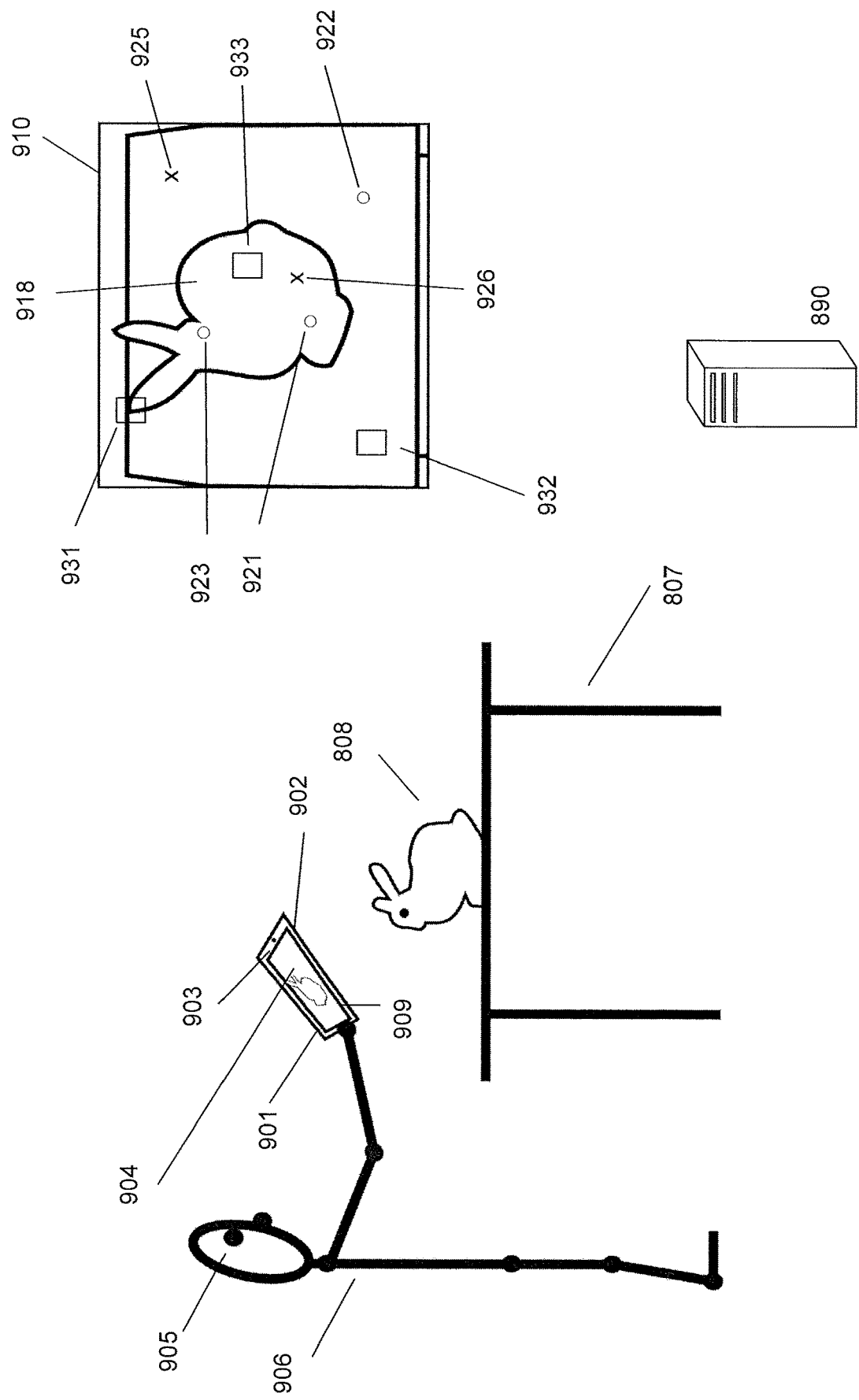
FIG. 9 shows another scenario of a user holding a mobile device that has a front facing camera, a back facing camera, and a display screen for recognizing, tracking and/or reconstructing an object of interest.

FIG. 9 shows another scenario with a user 906 holding a mobile device 901 that has a front facing camera 903, a back facing camera 902, and a display screen 904, and is capturing an image 910 by using the back facing camera 902 in order to recognize, track and/or reconstruct the plastic rabbit 808 (i.e. the object of interest) placed on the table 807. The mobile device 901 includes one or more processing devices 909, such as one or more microprocessors.

In the two scenarios shown in FIGS. 8 and 9, the users 806 and 906 may be the same or different. The mobile devices 801 and 901 may be the same or different. The front facing cameras 803 and 903, the back facing cameras 802 and 902, and the display screens 804 and 904 may be the same or different, respectively.

In one application, the plastic rabbit 808 may have to be recognized based on one image (e.g. the image 810) of at least part of the plastic rabbit 808 in order to retrieve or generate digital information (such as its manufacturer information, its CAD model, etc.) related to the plastic rabbit 808. The generated digital information could be visualized and overlaid on top of the image 810 of the plastic rabbit 808 in order to have an overlay image that could be shown on the display screen (like the screen 804). This would create Augmented Reality visualization.

In order to recognize the plastic rabbit 808, reference image features stored in a database (e.g., included in the mobile device 801, 901, or included in a remote server computer 890) are matched to current image features extracted in the image 810. The current image features may be the image features 831, 832, and 833, which could be represented based on pixel information of their respective rectangle regions by using high level descriptors, like SIFT, SURF, etc.

In one embodiment, when at least part of an image feature covers, or is derived from, pixel information of a part of an image region of an object of interest (e.g. the plastic rabbit 808), the image feature is related to the object of interest and would be considered as an image feature of interest. For example, high contrast textures within the object of interest could be determined as image features related to the object of interest, and/or borders (e.g. edges, corners) of the object of interest may be determined as image features related to the object of interest. In FIG. 8, the image features 831 and 833 are related to the plastic rabbit 808, while the image feature 832 that represents a corner of the table 807 is unrelated to the plastic rabbit 808.

The image features of interest could be created according to one embodiment (see FIG. 10) of the present invention. In this embodiment, only image features related to the plastic rabbit 808 may be determined as the image features of interest. In the present example, the image features 831 and 833, but not the image feature 832, would be determined as image features of interest. Depending on real scenarios, image features unrelated to the object of interest may also be determined as a part of the image features of interest. Nevertheless, the present invention may significantly remove image features unrelated to the object of interest from the image features of interest, which are to be used in various computer vision methods, such as Augmented Reality applications.

Further, any reference image features stored in a database may be generated by extracting image features from other images of the plastic rabbit 808. By using one embodiment (see FIG. 10) of the present invention, it is possible to determine image features of interest (e.g. image features related to the plastic rabbit 808) extracted from the other images as the reference image features.

Having only image features related to the object of interest or having a minimum number of image features unrelated to the object of interest in the reference image feature set and/or in the current image feature set, a matching between the reference image feature set and the current image feature set may be performed with a high accuracy and low operation time. This may improve the image based recognition, image based tracking, and/or image based reconstruction.

Further, in another application of tracking the plastic rabbit 808, which would be similar to the recognition, the current features extracted in the image 810 are matched to the reference features. From 3D positions associated with the reference features and the matching result, 2D-3D correspondences may be produced. The pose of the plastic rabbit 808 relative to the back-facing camera 802 that captures the image 810 may be determined based on the 2D-3D correspondences. Without the present invention, image features related to the table 807 (like image feature 832) may be extracted and matched to reference features and then 2D-3D correspondences would be generated for pose estimation. This may introduce errors in the pose estimation method to track the rabbit 808, especially when the rabbit 808 moves relative to the table 807.

In another application, the rabbit 808 may have to be reconstructed based on at least one image of at least part of the plastic rabbit 808. In one example, the reconstruction procedure may generate a plurality of 3D points from a plurality of image features (e.g. point features) extracted in the at least one image. A 3D geometrical model could then be derived from the plurality of 3D points. When depth information is available, the 3D points could be estimated from a single image according to the image positions of the image features and depth information associated with the image features. In another implementation, at least two images are used, and a 3D point could be estimated based on two corresponding image features in the at least two images, like that proposed in Davison, Andrew J., et al. "Mono-SLAM: Real-time single camera SLAM." Pattern Analysis and Machine Intelligence, IEEE Transactions on 29.6 (2007): 1052-1067 (hereinafter "Davidson et al."). It is advantageous if image features unrelated to the rabbit 808 are not used to create the 3D points for the reconstruction of the rabbit 808. For example, the image feature 832 in the image 810 and the image feature 932 in the image 910 are not used to create the 3D points for the rabbit 808.

In FIG. 8, the front facing camera 803, the back facing camera 802 and the display screen 804 are rigidly attached to the mobile device 801. Further, the mobile device 801 may have a processing device 809 and a wireless network unit. Any step of any embodiment disclosed herein could be either executed locally in the mobile device 801 by the processing device 809 or sent to a remote server computer 890 or another mobile device through the wireless network unit. The front facing camera 803, the back facing camera 802 and the display screen 804 may have known spatial relationships between each other.

Figure 10:
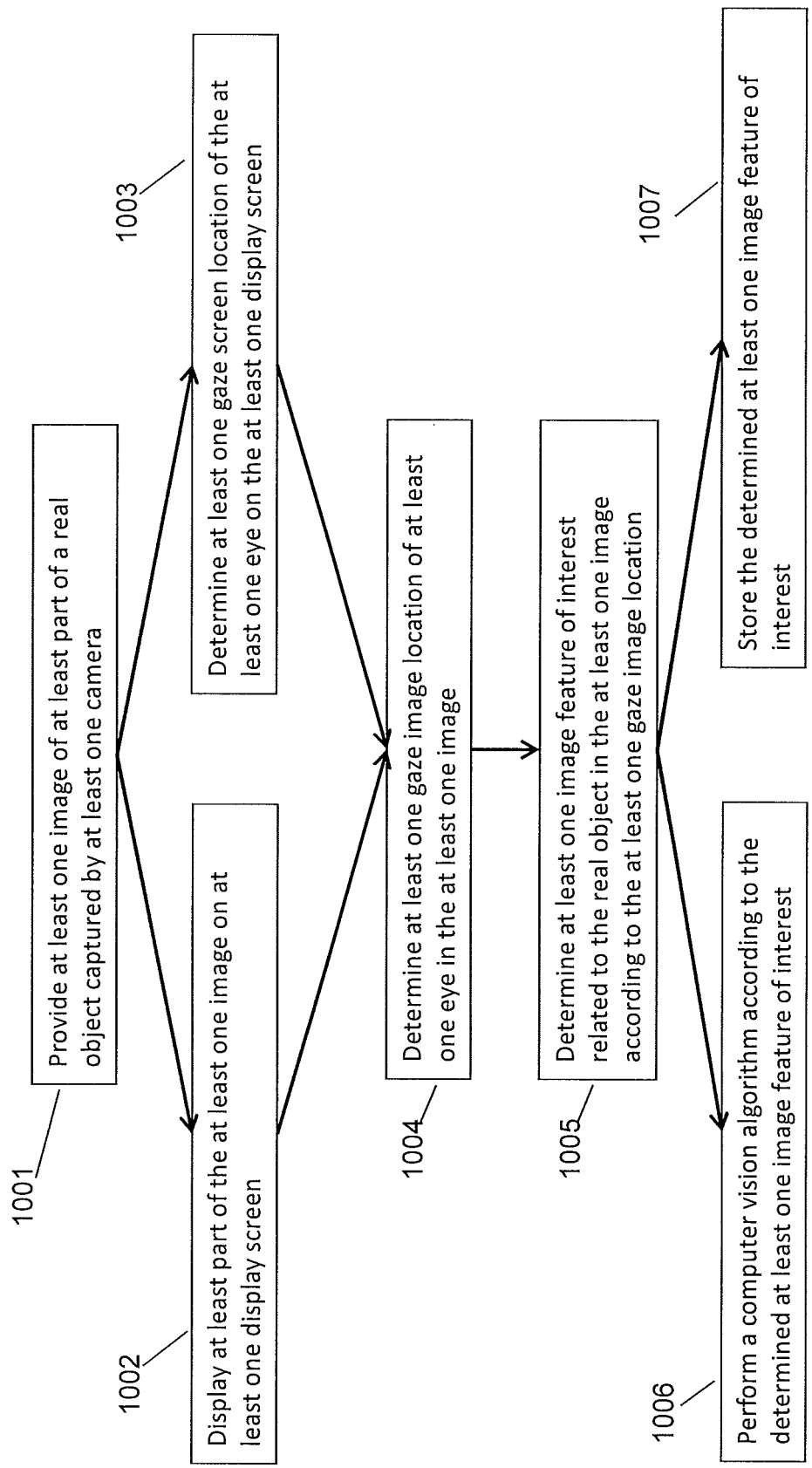
FIG. 10 shows a flow diagram of a method according to an embodiment of the invention.

FIG. 10 shows a workflow diagram of an embodiment of determining image features according to gaze location information.

Step 1001 provides at least one image of at least part of a real object captured by at least one camera. In the example shown in FIG. 8, an image 810 (i.e. the at least one image)

of the rabbit 808 (i.e. the real object) is provided and is captured by the back facing camera 802.

Step 1002 displays at least part of the at least one image on at least one display screen. For example, the image 810 is displayed on the display screen 804 as shown in FIG. 8. It is also possible to display a part of the image 810 on the display screen 804.

Step 1003 determines at least one gaze screen location of the at least one eye on the at least one display screen. Particularly, the gaze locations of the eye 805 on the display screen 804 may be determined.

Step 1002 and step 1003 may be synchronized such that a determined gaze may be related to an image displayed on the screen. For example, a gaze detected during a time period of displaying an image could be associated with the image.

Step 1004 determines at least one gaze image location of at least one eye in the at least one image. In the image 810, gaze image locations represented by circles are determined. The gaze image locations may be determined from the gaze screen locations. The gaze image locations may also be directly determined without explicitly computing the gaze screen locations. For example, when a conversion coefficient from a position on the screen to a position in the image is available, the gaze screen locations are not necessarily to be computed and stored.

In order to determine gaze locations on the screen and in the image, an eye tracker, like Tobii eye trackers (e.g. see http://www.tobii.com) or a camera, could be used.

In the scenario shown in FIG. 8, the front facing camera 803 attached to the display screen 804 may capture images of the eye 805. Various vision based methods (e.g. as disclosed in Blum et al.), could be used to determine gaze locations on the screen 804 based on the captured images of the eye 805.

The front facing camera 803 may also capture at least part of the face of the user 806. Various vision based face tracking or detection methods may be used to estimate at least one face direction relative to the camera 803 based on one or more images of the at least part of the face of the user 806 captured by the camera 803. Face direction locations on the screen 804 could be determined according to the at least one face direction. Face direction image locations may be computed from the face direction screen locations.

The front facing camera 803 may also capture at least part of one or two hands of the user 806. Various vision based methods may be used to estimate at least one hand pointing direction relative to the camera 803 based on one or more images captured by the camera 803. Hand pointing locations on the screen 804 could be determined according to the at least one hand pointing direction. Hand pointing image locations may be computed from the hand pointing screen locations.

Step 1005 determines at least one image feature of interest in the at least one image according to the at least one gaze image location.

In one embodiment of the present invention, the at least one image comprises one image and the at least one gaze image location comprises one gaze image location. Image segmentation may be performed to segment an image region of interest in the image from a seed point of the gaze image location. Image features that cover, or are derived from, pixel information of at least part of the image region of interest may be determined as the at least one image feature of interest. In one implementation, the image region of interest may first be determined. Then, a feature detection method is performed on the image region of interest to extract image features. The extracted image features would be the image features of interest. In another implementation, the feature detection method is performed on the original image to extract a plurality of image features. Image features are selected from the plurality of image features as the image features of interest if they cover or are derived from pixel information of at least part of the image region of interest. For a point feature, if its pixel position is within the image region of interest, the point feature would be an image feature of interest.

In FIG. 8, the image 810 is provided. The rabbit 808 (i.e. the object of interest to be recognized, tracked, and/or reconstructed) is captured in the image 810. The table 807 is also partially captured in the image 810. In a first example, only the gaze image location 821 is determined in the image 810. The gaze image location 821 may be used as an input for a segmentation method to segment the image region of interest in the image 810. For example, the gaze image location 821 is used as a starting point for a region grow method. In another implementation, a threshold value based on pixel information of a region around the gaze image location may be determined and used for thresholding based segmentation. In another way, a 2D geometry may be determined as the image region of interest in the image 810 based on the gaze image location 821. For example, a region of a square or a circle may be defined by the gaze image location 821 as their center point. In a further example, at least part of the image 810 may be divided into several image blocks, for instance according to image segmentation based on pixel values. At least one of the image blocks may be chosen as the image region of interest according to the gaze image location 821. In this case, an image block may be chosen if the gaze image location 821 is inside the image block, or close to the image block within a threshold. Moreover, when the image 810 has depth information for at least part of its pixels, the segmentation may further be based on the depth information. For example, the gaze image position may be used as a starting point of a region grow method, in which the depth information will be compared or analysed during the growing procedure.

Based on a region grow or thresholding segmentation that uses the gaze image location 821, the image region 818 of the rabbit may be determined. The image features 831 and 833 are determined as image features of interest, since they are within the image region 818, while the image feature 832 (i.e. the corner of the table 807) is not determined as an image feature of interest, since it is outside of the image region 818. The determined image features of interest (here, the image features 831 and 833) could be used to match with reference features (e.g. derived from reference images or derived from CAD models). Based on the matching result, the pose of the rabbit 808 relative to the back facing camera 802 may be estimated or the rabbit 808 may be recognized. The determined image features of interest (i.e. the image features 831 and 833) may also be used for the reconstruction of the rabbit 808.

In a second example, an image 810 is provided, and a plurality of gaze image locations (e.g., the gaze image locations 821-826) are determined in the image 810. In one implementation, at least part of the image 810 may be divided into several image blocks, for instance according to image segmentation based on pixel values. At least one of the image blocks may be chosen as the image region of interest according to positions of the plurality of gaze image locations. In this case, an image block may be chosen if a certain number of gaze image locations are inside the image block or close to the image block within a threshold. Thus, multiple image blocks may be chosen as the image region of interest. In another example, the plurality of gaze image locations may be grouped or clustered. In this case, an image block may be chosen if at least part of a certain group of gaze image locations are inside the image block or close to the image block within a threshold.

Point clustering methods may be employed to cluster or group the plurality of gaze image locations according to their 2D image locations. Methods, like connectivity based clustering (hierarchical clustering), distribution-based clustering (e.g. Gaussians for modelling clusters), and density-based clustering, could be used. Particularly, Gaussians distribution-based clustering may be preferred, as the user would most likely focus on the object of interest shown on the display screen. Further, when the image 810 has associated depth information for at least part of its pixels, the gaze image locations could also be clustered according to their depth. For example, gaze image locations having similar depth are grouped. In another example, gaze image locations whose corresponding 3D positions locate on the same plane are grouped.

A group with a largest number of gaze image locations may be selected from the clustering method. The gaze image locations of the selected group are determined as a plurality of gaze image locations of interest. Segmentation methods, like region grow and thresholding, may be used to determine a region of interest according to at least part of the plurality of gaze image locations of interest. Further, a region associated with each of the groups may also be determined from a clustering method, like Gaussians distribution-based clustering or density-based clustering methods. The region associated with the group having the largest number would be the image region of interest.

In one implementation, in order to have multiple determined gaze image locations in one image, a frequency of determining gaze may have to be higher than a frequency of displaying different images on the screen. For example, when displaying one image, more than one gaze should be able to be detected. In another implementation, one or more gaze image locations determined in one image may be mapped to image locations in another image by applying a transformation or a mapping. From this, multiple gaze image locations could be obtained in a single image. For example, the gaze image locations 925 and 926 (marked by crosses) in image 910 are mapped from the gaze image locations 825 and 826 in the image 810. The mapping may be a transformation (e.g. affine or projective) computed from a relative motion between the two back facing cameras 802 and 902 at positions where the images 810 and 910 are captured respectively. The mapping may also be computed by matching or registering the two images based on pixel information of the images.

In another embodiment of the present invention, the at least one image comprises multiple images and each of the multiple images has at least one gaze image location detected in each respective image. The multiple images may be captured by the same or different cameras. Further, the multiple images may be displayed on the same or different display screens.

The at least one gaze image location associated with each respective image may be mapped into one of other multiple images. The mapping may be a 2D transformation (e.g. rigid transformation, affine transformation, projective transformation, or homography) estimated based on the pose of the camera where the camera captures each respective image or the motion between the camera capturing the two images.

The camera motion or camera pose may be computed by using vision based methods, sensors (like GPS, compass, inertial sensor), or a dedicated tracking system. The dedicated tracking system may be an optical tracking system, a mechanical tracker (e.g. a robotic arm), or an indoor positioning system based on nearby anchors (e.g. Bluetooth receivers). The motion or pose may be represented by a 6 degree of freedom transformation including translations and rotations.

Having multiple gaze image locations in one of the multiple images, similar embodiments as mentioned above could be applied analogously to detect or select image features of interest in the image.

In a third example, images 810 and 910 are provided. The gaze image locations 821-826 are determined in the image 810 while the image 810 is shown on the screen 804, and the gaze image locations 921-923 are determined in the image 910 while the image 910 is shown on the screen 904. A motion between the back facing camera 802 where it captures the image 810 and the back facing camera 902 where it captures the image 910 can be determined based on computer vision based methods (e.g. using the images 810 and 910) or based on localization sensors (e.g. GPS, compass, gravity sensor, etc.). When the cameras 802 and 902 are attached to the same mobile device, inertial sensors attached to the mobile device could be used to estimate the motion or at least part of the motion.

From at least part of the motion and intrinsic parameters of the camera 802 and 902, a transformation, such as a homography, can be computed. Then, the transformation could be used to transform (or map) pixel coordinates between the images 810 and 910.

The gaze image locations 825 and 826 in the image 810 may be transformed to the image 910 at the locations 925 and 926 (marked by "X") according to the computed transformation. When multiple gaze image locations (921-926) in the image 910 are available, similar embodiments as mentioned above could be applied analogously to detect or select image features of interest in the image 910. For example, image features 931 and 933 may be determined as image features of interest.

The gaze image location 923 in the image 910 could also be transformed to the image 810 at the location 827 (marked by "X") according to the computed transformation. When multiple gaze image locations (821-827) in the image 810 are available, image features 831 and 833 may be determined as image features of interest according to the embodiments mentioned above.

Then, according to an embodiment, the image features of interest (e.g., the image features 931 and 933) detected in the image 910 are matched to the image features of interest (e.g., image features 831 and 833) detected in the image 810. Feature correspondences could be estimated according to similarity measures (e.g. sum of squared differences (SSD), sum of absolute differences (SAD), normalized cross correlation (NCC), and mutual information (MI)). Having the correspondences, 3D positions for the image features may be computed based on triangulation, like that proposed in Davidson et al. The 3D positions may be associated with the respective image features.

According to a further embodiment, it is possible to assign weights to the image features detected in the at least one image according to the at least one gaze image location. Then the image feature with assigned weights may be considered as the at least one image feature of interest.

For example, the image features 831, 832 and 833 are detected in the image 810. The image region 818 of the rabbit may be determined according to one or more gaze image locations based on any method disclosed herein. In this example, the image features 831 and 833 that are within the image region 818 may be assigned a weight A and the image feature 832 that is out of the image region 818 may be assigned a weight B. The weight A and the weight B are different. The weight A may also be assigned to the image region 818 and the weight B is assigned to the rest of the image 810. The weight A may be preferred to be higher than the weight B, as the weight A indicates a region of interest determined from the gaze image locations.

The weights may be determined according to the result of the clustering of a plurality of gaze image locations. For example, one or more groups of the gaze image locations may be determined according to the clustering, and thus one or more image regions may be determined based on the determined groups of the gaze image locations. One image region may be determined based on one group of the gaze image locations. A weight assigned to an image feature that is within or overlapped with an image region may be determined according to the number of the gaze image locations used to determine the image region. The larger number of the gaze image locations, the higher value may be determined for the weight.

In another implementation, the image feature, i.e. histogram, which is derived from pixels of an image region, may have a weight determined from gaze image locations in the image region. For example, the weight may be computed from the number of the gaze image locations in the image region or from a size of a cover area of the gaze image locations.

The determined image features and related weights may be provided to a subsequent computer vision method, e.g. tracking, recognition, classification and 3D reconstruction, or may be saved as reference image features in a database.

Step 1006 performs a computer vision algorithm according to the determined at least one image feature of interest. Various computer vision algorithms and applications based on image features may be applied as disclosed herein.

In one embodiment, a computer vision algorithm may be performed according to the determined at least one image feature of interest and the related weights. For example, a pose of the camera 802 relative to the rabbit 808 may be determined according to the image features 831, 832 and 833 detected in the image 810 and corresponding reference (3D or 2D) features. 2D projection errors or 3D errors (e.g. Euclidean distances) computed from the image features detected in the image 810 and corresponding reference (3D or 2D) features may be weighted based on respective weights associated with the image features 831, 832 and 833. The pose could be determined by minimizing the 2D projection errors or 3D errors.

Step 1007 stores the determined at least one image feature of interest. For example, the determined at least one image feature of interest may be saved as at least one reference image feature in a database in a local computer (e.g. of the mobile device) or a remote computer (e.g. a web server).

Optical-See-Through Embodiments:

In another embodiment using an optical see-through device (like a head mounted display with semitransparent glasses, as known in the art), the real object (like the rabbit) would not be shown on a display screen to the user. Rather, the user would directly see or observe the real object, e.g. through the semitransparent glasses. Thus, a gaze location of an eye appears directly on the real object, which is called herein a gaze real location.

In order to relate the gaze real location on the real object with an image of the real object captured by a camera (e.g., attached to the head mounted display), a gaze direction, that is a direction from the eye to the gaze real location with respect to the camera where the camera captures the image, may be used to determine an image position of the gaze real location in the image. The determined image position is equivalent to a gaze image location as described above. For this, depth information related to the image is used in order to find an intersection (i.e. the gaze real location) between the gaze direction and a surface of the real object in the camera coordinate system. The depth information may be from a depth sensor or estimated from two images or provided from the camera.

The gaze direction may be directly determined based on an eye tracker, like Tobii eye trackers (e.g. see http://www.tobii.com) or a camera (e.g. like proposed in Blum et al.), Then, image features of interest extracted in the image may be determined from the determined gaze image location or locations according to the various embodiments mentioned above.

In another embodiment, the gaze image location may be computed from the gaze direction without using the depth information. For example, the gaze direction from the eye to the gaze real location may be projected to the image plane of the camera where the camera captures the image. In this case, the gaze direction may be projected as a line in the image. This line would be the gaze image location.

Multiple gaze directions may be determined with respect to the camera at one location or with respect to the camera at different locations. When the camera is at different locations, the multiple gaze directions may be transformed to the camera coordinate system of the camera at any of the different locations according to the camera motion between the different locations. Having the multiple gaze directions, multiple projected lines in the image may be determined. At least part of an image area between the multiple projected lines may be used to segment the object in the image (e.g. to determine the image region of interest). Image features of interest may be extracted from the at least part of an image area between the multiple projected lines or from the determined image region of interest.

Figure 11:
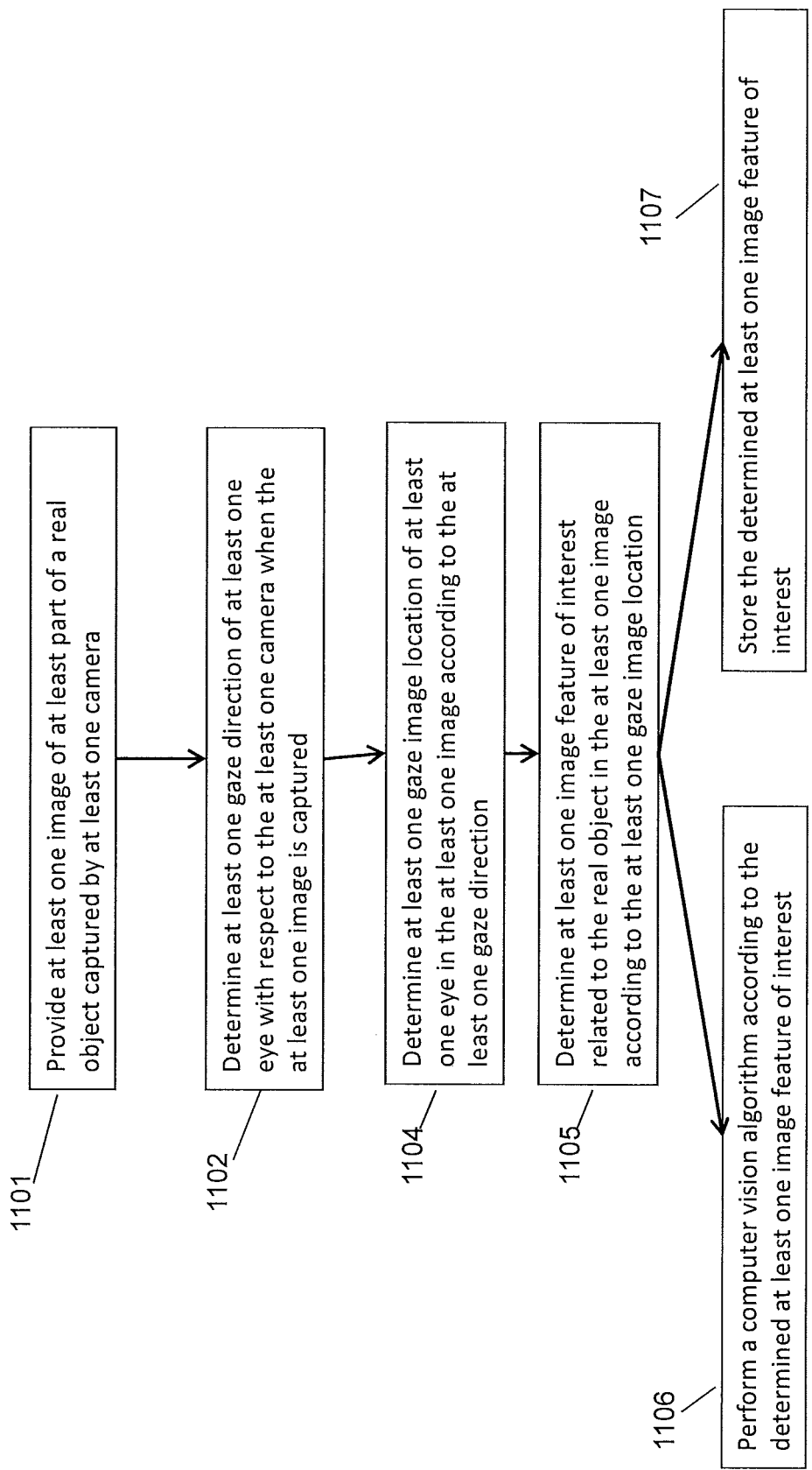
FIG. 11 shows a flow diagram of a method according to another embodiment of the invention.

FIG. 11 shows a workflow diagram of another embodiment of determining image features according to gaze location information, which may be applied in such optical-see-through embodiment.

In step 1101, there is provided at least one image of at least part of a real object captured by at least one camera. According to step 1102, at least one gaze direction of at least one eye is determined with respect to the at least one camera, the at least one camera being at a position where the at least one image is captured. Step 1104 includes determining at least one gaze image location of at least one eye in the at least one image according to the determined at least one gaze direction. Steps 1105 to 1107 correspond to the respective steps 1005 to 1007 as described above with reference to FIG. 10.

To estimate at least one gaze direction of at least one eye, an eye tracker system (e.g. a commercial eye tracker (e.g. see http://www.tobii.com) or a camera that captures the at least one eye (e.g. see Blum et al.)) may be used to determine a gaze direction in a coordinate system associated with the eye tracker. From a spatial relationship between the eye tracker and the camera that captures the image of the real object, the gaze direction could be determined with respect to the camera, the camera being at a position where the image of the real object is captured.

In another embodiment, the user 806 may not look at the display screen 804, but directly observes the real environment including the rabbit 808 and table 807, while the user 806 holds the mobile device 801 and points the back facing camera 802 to the rabbit 808. The rabbit 808 may be recognized, tracked and/or reconstructed based on one or more images of the rabbit 808 captured by the back facing camera 802. In this case, one or more gaze directions of the eye 805 with respect to the back facing camera 802 may be determined based on an image of the eye 805 captured by the front facing camera 803 using a method; e.g. as proposed in Blum et al. In this case, to perform any feature detection, computer vision process and/or augmented realty application (e.g. overlaying computer-generated graphics with the view of the real environment), the optical see-through device may not be required, while a video-see through device (e.g. the mobile device 801) may be employed.

It may be required to synchronize the process of capturing an image of the eye 805 by the camera 803 and the process of capturing an image of the rabbit 808 by the camera 802.

According to an embodiment, the processing system as described herein may be comprised at least in part in one of the mobile devices 801, 901 and/or in the server computer 890 adapted to communicate with the mobile devices 801, 901, e.g. wirelessly. The processing system may be comprised in only one of these devices, e.g. in the mobile device 801, 901 or in the server computer 890, or may be a distributed system in which one or more processing tasks (performing one or more method steps) are distributed and processed by one or more processing devices which are distributed and are communicating with each other.

Generally, the following further aspects and embodiments may be applied in connection with aspects of the invention.

Many Augmented Reality (AR) applications may benefit from the present invention. For example, in AR shopping, AR maintenance, and AR touring applications, there are multiple real objects located in the real world (for example, T-shirts for AR shopping, engine components for AR maintenance, and monuments for AR touring). The user is often interested in one object (i.e. the object of interest) at a time. The object of interest to the user could be determined according to the gaze of the user at that time. Then, only the object of interest may be detected, tracked, or reconstructed. Further, digital information related only to the object of interest could be generated and visually displayed in an image of the object in an AR view.

Gaze:

Gaze as used herein describes where the eye or eyes of a user is/are directed. A gaze direction of an eye or two eyes of a user is a direction from the eye(s) of the user to where the eye(s) is/are looking at. A gaze location of an eye or eyes of a user is a location where the eye(s) of the user is/are looking at. The gaze location may be a point, an area (e.g. a circle, a square, etc.), a line, etc. A gaze image location of an eye is an image position (or image positions) of a gaze location of an eye in an image. Similar to the gaze location, the gaze image location may be a point, an area (e.g. a circle, a square, etc.), a line, etc. A user should be understood as a person who is using the method or system as described herein, e.g. is looking at the display screen.

Attention Location:

An attention location of a user is a location where the user's attention direction focuses at in the real world. The attention location may be computed as an intersection between the attention direction and at least part of the real world. The user's attention direction originates from the user position and may be represented as a direction axis or as a cone shape wherein the apex is defined by the user position. The attention location may be a point, an area (e.g. a circle, a square, etc.), a line, etc.

An attention screen location of a user is a screen position (or image positions) of an attention location of the user in a screen. An image may be displayed on the screen. An attention image location of the user is an image position (or image positions) of an attention location of the user in the image. The attention screen location may be determined as an intersection between the attention direction and the screen plane. The attention image location may be derived from the corresponding attention screen location based on where the image is displayed on the screen.

The attention image location in an image captured by a camera may also be derived from the corresponding attention direction and a spatial relationship between the camera and the corresponding attention direction.

Similar to the attention location, the attention image (or screen) location may be a point, an area (e.g. a circle, a square, etc.), a line, etc.

A gaze direction is one specific example of the attention direction. Analogously, a gaze screen location is one specific example of the attention screen location, and a gaze image location is one specific example of the attention image location.

A face direction (e.g. the frontal face direction) is another specific example of the attention direction. Analogously, a face direction screen location is another specific example of the attention screen location, and a face direction image location is another specific example of the attention image location.

Object:

An object may be a real object which physically exists in the real world. The real object could be an indoor office or an outdoor scene. The real object could also be or include another real object, such as a sofa, a car, a human, a tree, a building, or a picture. An object may also be a virtual object which is digital information generated by a computer. The virtual object can be rendered as a virtual image, which could be on a screen. For example, the virtual object could be a virtual sofa or a virtual indoor room generated by a computer graphic software. A virtual object may also include another virtual object. For example, the virtual indoor room may include a virtual sofa.

Computer Vision Algorithm:

Potential computer vision methods or algorithms include processing, analyzing, and/or understanding images with the at least one knowledge of, but not limited to, camera intrinsic and/or extrinsic parameters, geometry, physics, statistics, and machine learning theory. A computer vision algorithm comprises at least one of, but is not limited to, image based recognition, image based tracking, image based reconstruction, image based classification, and image warping.

The image based recognition analyzes image features extracted in at least part of an image in order to recognize the image or identify at least one object visualized or captured in the image. For example, in visual search applications, a picture (e.g., on a cover of a CD album) is captured by a camera in a camera image and the image based recognition would identify the picture by analyzing the camera image in order to trigger relevant actions. For this, in one embodiment, an image region of the picture in the camera image may first be determined and the image of the picture would be compared with some reference images stored in a computer system in order to identify the picture. One challenge is to accurately detect the image region of the picture. In another embodiment, image features may be extracted from the camera image and matched with reference image features stored in a computer system. However, extracted image features that do not belong to the picture of the CD cover may disturb the matching.

Computer vision also includes 3D analysis from at least one image. Vision based Simultaneous Localization and Mapping (SLAM) (e.g. see Davidson et al.) is a well-known technology for creating a geometrical model of a real environment (or real object) without requiring any pre-knowledge of the real environment (or object) by using one or more images captured by a camera. Further, SLAM could track the position of the camera relative to the real environment (or object). The geometrical model that has at least depth information is also referred to as a 3D map of the real environment. The creation of the model of the environment is also called the reconstruction of the environment. The reconstructed geometrical model could be represented by a plurality of 3D image features (i.e. image features have associated 3D positions), such as 3D points, 3D edges, and/or 3D planes.

An object may be captured by a camera in at least one image. The image based tracking could detect positions and/or orientations of the object in a 3D space or in the 2D space of the at least one image. The image based tracking could also determine a pose of the camera. For this, image features (e.g. features of the object captured in the at least one image) are often detected in the at least one image and used in various image based tracking methods to determine poses of the object and/or the camera. However, detected image features that are not belonging to the object may disturb the tracking method.

The image based reconstruction is to compute a geometrical model of an object or a part of the object according to images of the object. Commonly, the reconstruction requires at least two images of the object captured from two different positions by a camera or different cameras. Image features are extracted in the at least two images and matched between the two images. For a matched feature, a triangulation could be used to determine a 3D position of the matched feature, which is an intersection of two rays. Each ray is defined by the image feature position in each of the two images and the camera optical center, the camera being at a position where the respective image is captured. Thus, a plurality of 3D positions of image features can be determined and used to compute the geometry of an object. However, image features extracted in the two images may not relate to the object. This would introduce errors or additional checks in the feature matching process. If a matched feature is not related to the object, the 3D position of the matched feature should not be used to determine geometry of the object.

Therefore, it is preferred to have a method to remove the unrelated detected image features or to detect only related image features in images, as described herein with aspects of the present invention.

Generally, in the following, a further explanation of terms is given and the following further aspects and embodiments may be applied in connection with aspects of the invention.

Camera:

A camera is often called an imaging device or capturing device. The proposed invention can generally be applied with any camera capable of providing images. It is not restricted to cameras providing color images in the RGB format. It can also be applied to any other color format and also to monochrome images, for example to cameras providing images in grayscale format or YUV format.

A camera often has intrinsic parameters including focal length and principal point. A camera may capture light that is visible to the human eye. A camera may also capture light that is invisible to the human eye, such as infrared light. For example, the camera may be a thermal imaging camera or infrared camera.

A camera providing an image with depth data is often called a depth camera. A depth camera system could be a time of flight (TOF) camera system or a passive stereo camera or an active stereo camera based on structured light. A depth camera may provide images whose pixels represent only depth data. A depth camera may capture both the light and depth data in a single image, e.g. RGB-D image. For the depth camera, the depth data does not need to be provided in the same resolution as the (color/grayscale) image.

For a standard camera model with a simplified pinhole or fisheye camera model, only light falling through a single point, i.e. the pinhole, is measured.

This invention may further use a light field camera that could capture an image from multiple different viewpoints and optionally with different focuses for the different viewpoints. Light field cameras are not limited to capturing only light falling through a single point, but measure also a plurality of light intensities incident at different locations.

Image:

An image is any data depicting or recording visual information or perception. The image could be a 2-dimensional image. The image could also be a 3-dimensional image, e.g. a depth image. An image may capture an object that reflects, refracts, and/or emits light that is visible and/or invisible to the human eye. The image may be in the RGB format. It can also be applied to any other color format and also to monochrome images, for example in grayscale format or YUV format. For example, an infrared image could capture an object that reflects, refracts, and/or emits light that is invisible to the human eye.

A depth image may be a 2D (color/grayscale) image with a corresponding depth map. The depth images do not need to be provided in the same resolution as the 2D image. The depth image may also be called 3D image. A depth image may only provide depth data.

Display Screen:

A display screen visually displays digital information. A display screen could be a reflective or emissive screen, e.g. LCD, LED, or OLED. In Augmented Reality applications, the visual integration of digital information (e.g. a virtual object) and a real object may be performed using a video-see-though device which comprises a camera and a reflective or emissive screen. In this configuration the camera captures an image of the real object or environment and then displays the captured image overlaid with a spatially registered computer-generated virtual object on the display screen. This configuration is referred to as video-see-through AR.

A display screen could also be a semi-transparent screen, like google glasses. One example is to place an optical-see-though device between the user's eye and the real object. The real object can then be directly observed through this semi-transparent screen of the optical-see-though device, while the virtual object is computer-generated and shown on the semi-transparent screen. This configuration is referred to as optical-see-through AR.

At least part of the display screen may be planar (e.g. a display surface) and may have a normal direction associated with the planar part. Typically, the normal direction is perpendicular to the planar part. The normal direction typically points from the display device to a user who observes, in front of the display device, visual information displayed on the at least part of the display device. At least part of the display screen may also be curved.

Image Feature:

A feature of an object is used to denote a piece of information related to the object. The piece of information may be visually perceivable to anatomical eyes or optical imaging devices. For example, a real object may emit or reflect visible light that could be captured by human eyes or cameras. The real object may also emit or reflect invisible light that could not be captured by human eyes, but could be captured by a camera (i.e. is optically perceivable). In another example, the feature may be associated with a virtual object (i.e. computer-generated object). The feature of the virtual object may be known or detectable in a computer or computer program, like computer graphic simulation software.

A feature may describe specific colors and/or structures, such as blobs, edge points, a particular region, and/or more complex structures of the real object. A feature may be represented by an image patch (e.g. pixel intensity) or a high level descriptor (e.g. SIFT, SURF). A feature may have 3D position and/or 3D orientation information in 3D Euclidean space relative to a coordinate system of the real object. This is often called a 3D feature.

A feature (i.e. piece of information related to the real object) may be extracted from an image of the real object captured by a camera, and thus a feature may have 2D image position and/or orientation in a coordinate system of the image. This is often called an/the image feature. An image feature may be a 2D image feature or a 3D image feature. When a camera could provide depth information, the feature extracted from an image of the camera may also have 3D position and/or orientation information.

A feature could be described by an equation that describes a geometric shape, for example a point, ray, straight line, circle, cone, or cylinder. Methods to detect features in an image that could be used in a method of the invention include, but are not limited to, local extrema of Laplacian of Gaussian (LoG), Difference of Gaussians (DoG) or Determinant of Hessian (DoH), Maximally Stable ExtremalRegions (MSER), Harris features, or learning-based corner detectors such as FAST. Also, methods that detect edges (edge elements) are suitable to be used in such methods. The feature detection method to be used is not limited to approaches working on a 2D intensity grayscale image, but can also be performed on images in any other color space, including RGB, HSV, and Lab, or range images that either exclusively contain depth information or provide both depth and intensity information. A method to describe features can work on any of the types of images explained above and may include SIFT (Scale-invariant feature transform), SURF (Speeded Up Robust Feature), GLOH (Gradient Location and Orientation Histogram), HOG (Histogram of Oriented Gradients), 2.5D-SIFT, or any other method to compare local features including classification-based methods like Random Ferns.

Real Object:

An object may be a real object which physically exists in the real world. A real object could be an indoor or an outdoor scene. A real object could also be or include another real object, such as a sofa, a car, a human, a tree, a building, or a picture. A real world or real environment may also be considered as a real object. The real environment may also include one or more real objects. For example, a city or a street may be a real environment. The street may further include buildings, trees, and a parking lot. The parking lot may be considered as another real environment. An image of a real object captured by a camera may contain the whole real object or a part of the real object.

An object may also be a virtual object which is digital information generated by a computer. The virtual object can be rendered as a virtual image, which could be on a screen. For example, the virtual object could be a virtual sofa or a virtual indoor room generated by a computer graphic software. The virtual object may also include another virtual object. For example, the virtual indoor room may include the virtual sofa.

Pose:

A pose of a first object relative to a second object (e.g. a coordinate system associated with the second object) describes a rigid transformation including a translation and/or a rotation between the first object and the second object. In some literatures, the pose of a first object relative to a second object indicates a rigid transformation from the first object to the second object, while the pose of the second object relative to the first object indicates a rigid transformation from the second object to the first object. Essentially, the pose of the second object relative to the first object may be considered equivalent to the pose of the first object relative to the second object, as they describe a transformation between the two objects.

In 3D space, a pose may include information for six degrees of freedom (DOFs) or a part of the six DOFs. The six DOFs include three DOFs for translations and three DOFs for rotations. In 2D space, a pose may include information for three degrees of freedom (DOFs) or a part of the three DOFs. The three DOFs include two DOFs for translations and one DOF for rotations.

A motion of a real object (e.g. a camera) describes a rigid transformation between the real object at one position and the real object at another position in a common coordinate system.

Camera Pose Determination:

A pose of a camera relative to a real world (e.g. a real object or a real environment) may be determined based on an image of at least part of the environment captured by the camera. In one implementation, a model of the real object can be used for model based matching. The model based matching could, for example, be based on point features, edge features, or image patches of any size and form. While point features are frequently used for highly textured objects, edge features are preferred if the real object has little texture. Model based matching requires the image used for pose determination to contain at least part of the real object described by the model. The real object could for example also include a fiducial marker in the environment. A model of the real object could be described by points, edges, polygons or their combinations. A model of the real object may also contain texture information, e.g. colors.

Determining a pose of the camera can also be realized by using a visual marker. This requires the visual marker at a known position relative to the real object. In this case, the camera pose with respect to the real object could be determined according to a camera pose with respect to the visual marker, which is estimated based on an image of the camera containing the visual marker. It is not necessary for the image to contain at least part of the real object when the visual marker is used for the camera pose determination.

A camera motion between two camera positions may be determined by camera poses at the two camera positions. A camera motion may also be determined according to two images captured by the camera at the two camera positions. For example, common image features in the two images may be employed to determine the camera motion.

Spatial Relationship:

A spatial relationship specifies how an object is located in 2D or 3D space in relation to another object. For example, a spatial relationship is defined in terms of translation, and/or rotation, and/or scale. A spatial relationship may be a rigid transformation. A spatial relationship may define topological relations between a first object and a second object. The topological relations may include at least one of, but is not limited to, equals, disjoints, intersects, touches, covers, covered by, and within. A spatial relationship may define directional relations between a first object and a second object. For example, the spatial relationship may indicate the first object is on the back inside the second object. In another example, the spatial relationship may indicate the first object is behind (outside) the second object. A spatial relationship may define distance relations between a first object and a second object, e.g. at; nearby; in the vicinity; far away.

Purchasing Information:

Any information related to a process of purchasing one or more items may be regarded as purchasing information of the one or more items. In an example, the purchasing information of a jacket could be the location of a real store or the web link of an online shop where the jacket is available for purchasing. The purchasing information could also be prices or material. The purchasing information could also be an order or invoice. The purchasing information may also be the availability (e.g. in stock or in 3 days available) of a jacket in a shop.

The invention claimed is:

1. A non-transitory computer readable medium storing instructions executable by one or more processors to:
   determine a camera pose of a first camera of a plurality of scene cameras mounted on a system;
   determine an attention direction of a user of the system based on sensor data captured by a user-facing camera of the system;
   determine that a field of view of the first camera overlaps the attention direction based on the camera pose and the attention direction; and
   in response to the field of view overlapping the attention direction:
      obtain an image captured by the first camera; and
      identify an object of interest in the obtained image by projecting the attention direction into the obtained image to identify a region of interest within the image.

2. The non-transitory computer readable medium of claim 1, wherein the sensor data includes an image of a hand of the user, and wherein the attention direction includes a direction in which the hand of the user is pointing.

3. The non-transitory computer readable medium of claim 1, wherein sensor data includes an electrooculogram.

4. The non-transitory computer readable medium of claim 1, wherein the instructions are further executable by the one or more processors to initiate display of enhanced information related to the object of interest.

5. The non-transitory computer readable medium of claim 4, wherein the enhanced information related to the object of interest includes an indication of a material included in the object of interest, a size of the object of interest, a link to a webpage including additional information related to the object of interest, or a combination thereof.

6. The non-transitory computer readable medium of claim 1, further comprising instructions executable by the one or more processors to obtain the image by selecting the obtained image from a plurality of images captured by the plurality of scene cameras.

7. The non-transitory computer readable medium of claim 6, wherein capture of the image of the first camera of the plurality of scene cameras and capture of the sensor data by the user-facing camera are asynchronous.

8. A method comprising:
   determining a camera pose of a first camera of a plurality of scene cameras mounted on a system, the camera pose;
   determining an attention direction of a user of the system based on sensor data captured by a user-facing camera of the system;
   determining that a field of view of the first camera overlaps the attention direction based on the camera pose and the attention direction; and
   in response to the field of view overlapping the attention direction:
      obtaining an image captured by the first camera; and
      identifying an object of interest in the obtained image by projecting the attention direction into the obtained image to identify a region of interest within the image.

9. The method of claim 8, wherein the sensor data includes an image of a hand of the user, and wherein the attention direction includes a direction in which the hand of the user is pointing.

10. The method of claim 8, wherein sensor data includes an electrooculogram.

11. The method of claim 8, further comprising:
   displaying enhanced information related to the object of interest.

12. The method of claim 11, wherein the enhanced information related to the object of interest includes an indication of a material included in the object of interest, a size of the object of interest, a link to a webpage including additional information related to the object of interest, or a combination thereof.

13. The method of claim 8, further comprising:
   obtaining the image by selecting the obtained image from a plurality of images captured by the plurality of scene cameras.

14. The method of claim 13, wherein capture of the image of the first camera of the plurality of scene cameras and capture of the sensor data by the user-facing camera are asynchronous.

15. A system comprising:
   a plurality of scene cameras;
   a user-facing camera;
   one or more processors;
   one or more computer readable media storing instructions executable by the one or more processors to:
      determine a camera pose of a first camera of the plurality of scene cameras mounted on the system, the camera pose associated with the system;
      determine an attention direction of a user of the system based on sensor data captured by the user-facing camera of the system;
      determine that a field of view of the first camera overlaps the attention direction based on the camera pose and the attention direction; and
      in response to the field of view overlapping the attention direction:
         obtain an image captured by the first camera; and identify an object of interest in the obtained image by projecting the attention direction into the obtained image to identify a region of interest within the image.

16. The system of claim 15, wherein the sensor data includes an image of a hand of the user, and wherein the attention direction includes a direction in which the hand of the user is pointing.

17. The system of claim 15, further comprising instructions executable by the one or more processors to initiate display of enhanced information related to the object of interest.

18. The system of claim 17, wherein the enhanced information related to the object of interest includes an indication of a material included in the object of interest, a size of the object of interest, a link to a webpage including additional information related to the object of interest, or a combination thereof.

19. The system of claim 15, wherein the instructions are further executable by the one or more processors to obtain the image by selecting the obtained image from a plurality of images captured by the plurality of scene cameras.

20. The system of claim 19, wherein capture of the image of the first camera of the plurality of scene cameras and capture of the sensor data by the user-facing camera are asynchronous.

* * * * *